(12) United States Patent
Gomi

(10) Patent No.: US 11,174,594 B2
(45) Date of Patent: Nov. 16, 2021

(54) SHEET MANUFACTURING APPARATUS

(71) Applicant: SEIKO EPSON CORPORATION, Tokyo (JP)

(72) Inventor: Katsuhito Gomi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 492 days.

(21) Appl. No.: 16/328,357

(22) PCT Filed: Aug. 7, 2017

(86) PCT No.: PCT/JP2017/028607
§ 371 (c)(1),
(2) Date: Feb. 26, 2019

(87) PCT Pub. No.: WO2018/043047
PCT Pub. Date: Mar. 8, 2018

(65) Prior Publication Data
US 2021/0292971 A1    Sep. 23, 2021

(30) Foreign Application Priority Data

Aug. 31, 2016 (JP) ............................. JP2016-169473

(51) Int. Cl.
| | | |
|---|---|---|
| *D21F 9/02* | (2006.01) | |
| *D04H 1/732* | (2012.01) | |
| *D21B 1/06* | (2006.01) | |
| *D21H 17/20* | (2006.01) | |
| *D21H 23/20* | (2006.01) | |
| *D21F 7/00* | (2006.01) | |

(52) U.S. Cl.
CPC ............... *D21F 9/02* (2013.01); *D04H 1/732* (2013.01); *D21B 1/061* (2013.01); *D21B 1/063* (2013.01); *D21F 7/008* (2013.01); *D21H 17/20* (2013.01); *D21H 23/20* (2013.01)

(58) Field of Classification Search
CPC ........... D21F 9/02; D21F 7/008; D21H 23/20; D21H 17/20; D21B 1/061; D21B 1/063; D04H 1/732
See application file for complete search history.

(56) References Cited

U.S. PATENT DOCUMENTS

| | | | |
|---|---|---|---|
| 10,919,179 B2 * | 2/2021 | Watabe | .................. D04H 1/732 |
| 10,954,631 B2 * | 3/2021 | Kobayashi | ................ D21F 2/00 |
| 11,000,968 B2 * | 5/2021 | Mikoshiba | ............. D04H 1/732 |
| 11,001,966 B2 * | 5/2021 | Kobayashi | ............... D21B 1/32 |
| 2016/0106143 A1 | 4/2016 | Mei et al. | |
| 2016/0168795 A1 | 6/2016 | Fujita | |

(Continued)

FOREIGN PATENT DOCUMENTS

| | | | | |
|---|---|---|---|---|
| CN | 103892440 A | | 7/2014 | |
| EP | 3508636 A1 * | | 7/2019 | ............... D21B 1/08 |

(Continued)

*Primary Examiner* — Jose A Fortuna
(74) *Attorney, Agent, or Firm* — Global IP Counselors, LLP

(57) ABSTRACT

A sheet manufacturing apparatus includes: a defibration unit that defibrates a raw material containing fibers in a gas atmosphere; and a sheet former that forms a sheet by using at least a part of defibrated substances obtained through a defibrating process performed by the defibration unit. The defibration unit and the sheet former are thermally blocked from each other.

17 Claims, 10 Drawing Sheets

(56) References Cited

U.S. PATENT DOCUMENTS

| | | |
|---|---|---|
| 2016/0258112 A1 | 9/2016 | Gomi et al. |
| 2017/0203478 A1* | 7/2017 | Gomi ................. B29C 35/0277 |
| 2017/0204561 A1* | 7/2017 | Higuchi ............... B02C 18/141 |
| 2019/0145023 A1* | 5/2019 | Higuchi ................ B65G 45/18 19/65 A |
| 2019/0193296 A1* | 6/2019 | Mikoshiba ............ D04H 1/413 |
| 2019/0218713 A1* | 7/2019 | Oguchi ..................... D21F 9/00 |
| 2019/0232606 A1* | 8/2019 | Ota ......................... D04H 1/44 |
| 2019/0264393 A1* | 8/2019 | Taniguchi ................ D21F 9/00 |
| 2019/0301092 A1* | 10/2019 | Yamasaki ............. D21B 1/063 |
| 2019/0381690 A1* | 12/2019 | Watabe ................... D21B 1/08 |
| 2020/0011009 A1* | 1/2020 | Arai ...................... D04H 1/732 |
| 2020/0039769 A1* | 2/2020 | Miyasaka ............... B65H 3/06 |
| 2021/0062415 A1* | 3/2021 | Abe ......................... D21F 9/00 |

FOREIGN PATENT DOCUMENTS

| | | | | |
|---|---|---|---|---|
| GB | 1154324 A | * | 6/1969 | .............. D04H 1/74 |
| JP | 2016-112740 A | | 6/2016 | |
| JP | 2016-113710 A | | 6/2016 | |
| JP | 2016-113713 A | | 6/2016 | |
| JP | 2016-163944 A | | 9/2016 | |

* cited by examiner

SHEET MANUFACTURING APPARATUS

CROSS-REFERENCE TO RELATED APPLICATIONS

This application is a U.S. National stage application of International Patent Application No. PCT/JP2017/028607, filed on Aug. 7, 2017, which claims priority under 35 U.S.C. § 119(a) to Japanese Patent Application No. 2016-169473, filed in Japan on Aug. 31, 2016. The entire disclosure of Japanese Patent Application No. 2016-169473 is hereby incorporated herein by reference.

TECHNICAL FIELD

The present invention relates to a sheet manufacturing apparatus.

BACKGROUND ART

In the related art, there is known a technology in which fiber-shaped substances are accumulated, and a bonding force is applied between accumulated fibers such that a sheet-shaped or film-shaped formed product is obtained. For example, there is known a method of manufacturing paper by paper forming (papermaking) technique using water. In addition, Japanese Unexamined Patent Application Publication No. 2016-112740 discloses a dry sheet manufacturing apparatus. In this manufacturing apparatus, a raw material is defibrated, waste powder such as toner is removed from defibrated substances such that fibers are picked out, and a sheet is formed by using the fibers.

In the dry sheet manufacturing apparatus in the related art, there is a concern that a fiber will be charged, and the charged fiber will be attached to each member of the apparatus. Therefore, there is a demand for a method for preventing or suppressing the fiber from being charged.

SUMMARY

An object of the present invention is to suppress charging of a fiber effectively in a sheet manufacturing apparatus that forms a sheet by using fibers obtained by defibrating a raw material.

In order to solve such a problem described above, the present invention provides a sheet manufacturing apparatus including: a defibration unit that defibrates a raw material containing fibers in a gas atmosphere; and a sheet former that forms a sheet by using at least a part of defibrated substances obtained through a defibrating process performed by the defibration unit, in which the defibration unit and the sheet former are thermally blocked from each other.

According to the present invention, since the sheet former is configured to be unlikely to be influenced by heat emitted from the defibration unit, it is possible to suppress drying of the fibers in the sheet former, and thereby it is possible to suppress charging of the fibers.

In order to solve such a problem described above, the present invention provides a sheet manufacturing apparatus including: a defibration unit that defibrates a raw material containing fibers in a gas atmosphere; a sheet former that forms a sheet by using at least a part of defibrated substances obtained through a defibrating process performed by the defibration unit; and a partition plate that is a partition between the defibration unit and the sheet former.

According to the present invention, the partition plate enables the sheet former to be less influenced by the heat emitted from the defibration unit. Therefore, it is possible to suppress drying of the fibers in the sheet former, and thereby it is possible to suppress charging of the fibers.

In addition, in the present invention, the sheet manufacturing apparatus includes: a housing that accommodates the defibration unit and the sheet former; an exhaust unit that releases air from a rear surface of the housing; and a partition plate that partitions an inside of the housing into a front section and a rear section, in which the partition plate is provided with a vent hole for ventilation from the front section to the rear section of the housing.

According to the present invention, since it is possible to perform ventilation from the front section to the rear section of the housing and release air from the rear surface, it is possible to suppress propagation of heat from the rear section to the front section of the housing and dissipate heat out of the housing effectively. Therefore, since it is possible to decrease the propagation of heat from an instrument that generates a large amount of heat to another instrument, it is possible to suppress drying of fibers due to the heat generated from the instrument, and it is possible to suppress charging of the fibers.

In addition, in the present invention, the sheet manufacturing apparatus includes: a housing that accommodates the defibration unit and the sheet former; and an exhaust unit that releases air from a rear surface of the housing, in which the partition plate is disposed to partition an inside of the housing into a front section and a rear section and is provided with a vent hole for ventilation from the front section to the rear section of the housing.

According to the present invention, since it is possible to perform ventilation from the front section to the rear section of the housing, which is partitioned off by the partition plate, and release air from the rear surface, it is possible to suppress propagation of heat from the rear section to the front section of the housing and dissipate heat out of the housing effectively. Therefore, since it is possible to decrease the propagation of heat from an instrument that generates a large amount of heat to another instrument, it is possible to suppress drying of fibers due to heat generated from the instrument, and it is possible to suppress charging of the fibers.

In addition, in the present invention, the sheet manufacturing apparatus further includes: a suction unit that suctions matter to be removed, which is not used in the sheet, from the defibrated substances obtained through the defibrating process performed by the defibration unit; and a trapping unit that traps the matter to be removed which is suctioned by the suction unit, in which the defibration unit, the suction unit, and the trapping unit are installed in the rear section that is partitioned off by the partition plate.

According to the present invention, it is possible to release heat from the defibration unit, the suction unit, and trapping unit rapidly out of the housing. Therefore, it is possible to suppress drying of the fibers due to an influence of heat from the units, and thereby it is possible to suppress charging of the fibers. In addition, since instruments that perform a process of suctioning and trapping the matter to be removed from the defibrated substances are disposed in a concentrated manner, it is possible to perform movement of the defibrated substances and the matter to be removed efficiently, and it is possible to enhance utilization efficiency of an internal space of the housing.

In addition, in the present invention, the sheet manufacturing apparatus includes: an air current pipe through which an air current after the suction unit performs suction and the trapping unit traps the matter to be removed flows; a straightener that straightens the air current flowing through the air current pipe; and a detector that measures at least one of a flow speed and a temperature of the air current in the air current pipe.

According to the present invention, the detector measures at least one of the flow speed and the temperature of the air current after the trapping unit traps the matter to be removed, and thereby it is possible to detect a state of the air current in the sheet manufacturing apparatus in detail. Therefore, it is possible to appropriately control a fan or a blower included in the sheet manufacturing apparatus, and it is possible to enhance the utilization efficiency of the air current.

In addition, in the present invention, the sheet manufacturing apparatus includes: a vaporization-type humidifying unit that vaporizes water so as to supply humidified air, in which the vaporization-type humidifying unit is installed in the rear section that is partitioned off by the partition plate.

According to the present invention, it is possible to suppress charging of the fibers by using the humidified air, and it is possible to use high-temperature air by the vaporization-type humidifying unit by disposing the vaporization-type humidifying unit together with the defibration unit and the like in the rear section. Therefore, it is possible to cause the humidified air to contain a larger amount of moisture by the vaporization-type humidifying unit, and thus it is possible to perform humidifying more efficiently.

In addition, in the present invention, the sheet manufacturing apparatus includes a water supply unit that is filled with water from a supply port installed on a side of a front surface of the housing and supplies water to the vaporization-type humidifying unit.

According to the present invention, it is possible to easily supply water to the vaporization-type humidifying unit disposed in the rear section of the housing from the side of the front surface of the housing.

In addition, in the present invention, the sheet former includes a web former that accumulates defibrated substances obtained through a defibrating process performed by the defibration unit and forms a web; a pressurizing unit that pressurizes the web formed by the web former so as to form a sheet; and a cutter that cuts the sheet formed by the pressurizing unit into a preset size, in which the web former, the pressurizing unit, and the cutter are installed in the front section that is partitioned off by the partition plate.

According to the present invention, it is possible to dispose functional units that configure the sheet former at a position that is unlikely to be influenced by the heat from the defibration unit or the like. Therefore, it is possible to suppress drying of the fibers in the sheet former, and thereby, it is possible to suppress charging of the fibers. Consequently, it is possible to improve manufacturing efficiency of the sheet and to achieve uniform sheet quality.

In addition, in the present invention, the sheet manufacturing apparatus includes a mixer that mixes a resin and the defibrated substances obtained through defibration performed by the defibration unit in a gas atmosphere, in which the sheet former includes a heating unit that heats a mixture mixed by the mixer, and the mixer and the heating unit are installed in the front section that is partitioned off by the partition plate.

According to the present invention, in the dry sheet manufacturing apparatus that mixes and heats the defibrated substances and the resin in a gas atmosphere, it is possible to dispose the mixer at a position that is unlikely to be influenced by the heat from the defibration unit or the like. Therefore, it is possible to suppress charging of the fibers in a process of mixing the defibrated substances and the resin in the gas atmosphere, and it is possible to improve manufacturing efficiency of the sheet and to achieve uniform sheet quality.

In addition, in the present invention, the sheet manufacturing apparatus includes: a sorting unit that sorts the defibrated substances obtained through defibration performed by the defibration unit into a first sorted substance and a second sorted substance; a first sorted substance transport pipe through which the first sorted substance sorted by the sorting unit is transported along with an air current to the mixer; and a resin supply unit that supplies the resin contained in a resin container to the first sorted substance transport pipe, in which the first sorted substance transport pipe and the resin supply unit may be installed in the front section that is partitioned off by the partition plate.

According to the present invention, a process of sorting the defibrated substances, a process of transporting the sorted first sorted substance, and a process of supplying the resin are performed at a position that is unlikely to be influenced by the heat from the defibration unit or the like, and thereby it is possible to suppress charging of the fibers and improve the manufacturing efficiency of the sheet or achieve uniform sheet quality.

In addition, in the present invention, the sheet manufacturing apparatus includes a door that is positioned on the front surface of the housing and is openable and closable, in which the resin container is installed to face the door.

According to the present invention, it is possible to easily perform work on the resin container.

In addition, in the present invention, the sorting unit is installed at a higher position than the defibration unit, and the sheet manufacturing apparatus includes a return pipe which penetrates the partition plate and through which the second sorted substance sorted by the sorting unit is transported to the defibration unit.

According to the present invention, the second sorted substances sorted from the defibrated substances can be transported to the defibration unit, be subjected to the defibrating process, and be again used as the raw material. In addition, it is possible to dispose the sorting unit at a higher position than the defibration unit, and thereby it is possible to easily transport the second sorted substances to the defibration unit from the sorting unit. For example, it is possible to employ a configuration in which the second sorted substance sorted by the sorting unit falls to the defibration unit through the return pipe.

In addition, in the present invention, the sheet manufacturing apparatus includes: a rough crushing unit that roughly crushes the raw material so as to supply crushed material to the defibration unit; and a cutter that is installed at a higher position than the rough crushing unit and cuts the sheet formed by the sheet former into a preset size, in which offcuts cut by the cutter are transported to the rough crushing unit.

According to the present invention, in a case where the offcuts are generated by the cutter, the offcuts can be transported to the rough crushing unit so as to be used as the raw material of the sheet. In addition, since the offcuts are unlikely to be influenced by the heat from the defibration unit or the like in a process of being transported from the cutter, it is possible to suppress charging of the offcuts. In addition, it is possible to dispose the cutter at a higher position than the defibration unit, and thereby it is possible to easily transport the offcuts to the rough crushing unit from the cutter. For example, it is possible to employ a configuration in which the offcuts generated by the cutter freely fall toward the rough crushing unit.

In addition, in the present invention, the sheet manufacturing apparatus includes an electrical unit that is installed outside the housing and supplies electric power to a power component included in the defibration unit and the sheet former.

According to the present invention, it is possible to dispose the electrical unit outside the housing, and thereby it is possible to suppress an influence of heat from the electrical unit on the fibers of the raw material of the sheet. In addition, it is possible to cool the electrical unit efficiently. In addition, it is possible to protect the electrical unit from powder dust or the like generated in the housing.

In addition, in the present invention, the sheet manufacturing apparatus includes a raw material supply unit that is disposed on the front surface of the housing and supplies the raw material to the rough crushing unit.

According to the present invention, it is possible to easily perform work on the raw material supply unit from the side of the front surface of the housing.

According to the present invention, there is provided a sheet manufacturing apparatus including: a defibration unit that defibrates a raw material containing fibers in a gas atmosphere; a first web former that accumulates defibrated substances obtained through a defibrating process performed by the defibration unit and forms a first web; a mixer that mixes a resin and defibrated substances accumulated by the first web former in a gas atmosphere; and a second web former that accumulates the defibrated substances and the resin mixed by the mixer and forms a second web. The defibration unit and the second web former are thermally blocked from each other.

In the sheet manufacturing apparatus of the present invention, the defibration unit and the first web former may be thermally blocked from each other.

According to the present invention, there is provided a sheet manufacturing apparatus including: a defibration unit that defibrates a raw material containing fibers in a gas atmosphere; a first web former that accumulates defibrated substances obtained through a defibrating process performed by the defibration unit and forms a first web; a mixer that mixes a resin and defibrated substances accumulated by the first web former in a gas atmosphere; a second web former that accumulates the defibrated substances and the resin mixed by the mixer and forms a second web; and a first partition plate that is a partition between the defibration unit and the second web former.

The sheet manufacturing apparatus of the present invention may further include a second partition plate that is a partition between the defibration unit and the first web former.

The sheet manufacturing apparatus of the present invention may further include: a housing that accommodates the defibration unit, the first web former, the mixer, and the second web former; and the first partition plate that partitions an inside of the housing into a front section and a rear section of the housing. The second web former may be provided in the front section. The first web former, the mixer, and the defibration unit may be provided in the rear section. The first partition plate may be provided with a vent hole for ventilation from the front section to the rear section of the housing. The sheet manufacturing apparatus may further include an exhaust unit on the rear section side of the housing.

The sheet manufacturing apparatus of the present invention may further include: a housing that accommodates the defibration unit, the first web former, the mixer, and the second web former; and a second partition plate that partitions the inside of the housing into a front section and a rear section of the housing. The first web former, the mixer, and the second web former may be provided in the front section. The defibration unit may be provided in the rear section. The second partition plate may be provided with a vent hole for ventilation from the front section to the rear section of the housing. The sheet manufacturing apparatus may further include an exhaust unit on the rear section side of the housing.

The sheet manufacturing apparatus of the present invention may further include: a suction unit that suctions matter to be removed, which is not used in the second web, from the defibrated substances obtained through the defibrating process performed by the defibration unit; and a trapping unit that traps the matter to be removed which is suctioned by the suction unit. The defibration unit, the suction unit, and the trapping unit may be installed in the rear section.

The sheet manufacturing apparatus of the present invention may further include: an air current pipe through which an air current after the suction unit performs suction and the trapping unit traps the matter to be removed flows; a straightener that straightens the air current flowing through the air current pipe; and a detector that measures at least one of a flow speed and a temperature of the air current in the air current pipe.

The sheet manufacturing apparatus of the present invention may further include: a vaporization-type humidifying unit that vaporizes water so as to supply humidified air. The vaporization-type humidifying unit may be installed in the rear section.

The sheet manufacturing apparatus of the present invention may further include: a pressurizing unit that pressurizes the second web formed by the second web former so as to form a sheet; and a cutter that cuts the sheet formed by the pressurizing unit into a preset size. The pressurizing unit and the cutter may be installed in the front section.

The sheet manufacturing apparatus of the present invention may further include: a heating unit that heats a mixture mixed by the mixer. The heating unit may be installed in the front section.

The sheet manufacturing apparatus of the present invention may further include: a sorting unit that sorts the defibrated substances obtained through defibration performed by the defibration unit into a first sorted substance and a second sorted substance; a first sorted substance transport pipe through which the first sorted substance sorted by the sorting unit is transported along with an air current to the mixer; and a resin supply unit that supplies the resin contained in a resin container to the first sorted substance transport pipe. The first sorted substance transport pipe and the resin supply unit may be installed in the front section.

In the sheet manufacturing apparatus of the present invention, the sorting unit may be installed at a higher position than the defibration unit in a direction of gravitational force. The sheet manufacturing apparatus may further include a return pipe through which the second sorted substance sorted by the sorting unit is transported to the defibration unit.

The sheet manufacturing apparatus of the present invention may further include: a rough crushing unit that roughly crushes the raw material and supplies a crushed material to the defibration unit. Offcuts cut by the cutter may be transported to the rough crushing unit.

The sheet manufacturing apparatus of the present invention may further include: an electrical unit that is installed outside the housing and supplies electric power to a power component included in the defibration unit.

According to the present invention, there is provided a sheet manufacturing apparatus including: a defibration unit that defibrates a raw material containing fibers in a gas atmosphere; a first web former that accumulates defibrated substances obtained through a defibrating process performed by the defibration unit and forms a first web; a mixer that mixes a resin and defibrated substances accumulated by the first web former in a gas atmosphere; a second web former that accumulates the defibrated substances and the resin mixed by the mixer and forms a second web; and a first partition plate that is a partition between the defibration unit and the first web former.

The sheet manufacturing apparatus of the present invention may further include: a second partition plate that is a partition between the mixer and the second web former.

The invention can be realized as various aspects, in addition to the sheet manufacturing apparatus described above. For example, it is possible to configure a system including the sheet manufacturing apparatus described above.

DESCRIPTION OF EMBODIMENTS

Hereinafter, embodiments of the present invention will be described with reference to the drawings.

Figure 1:
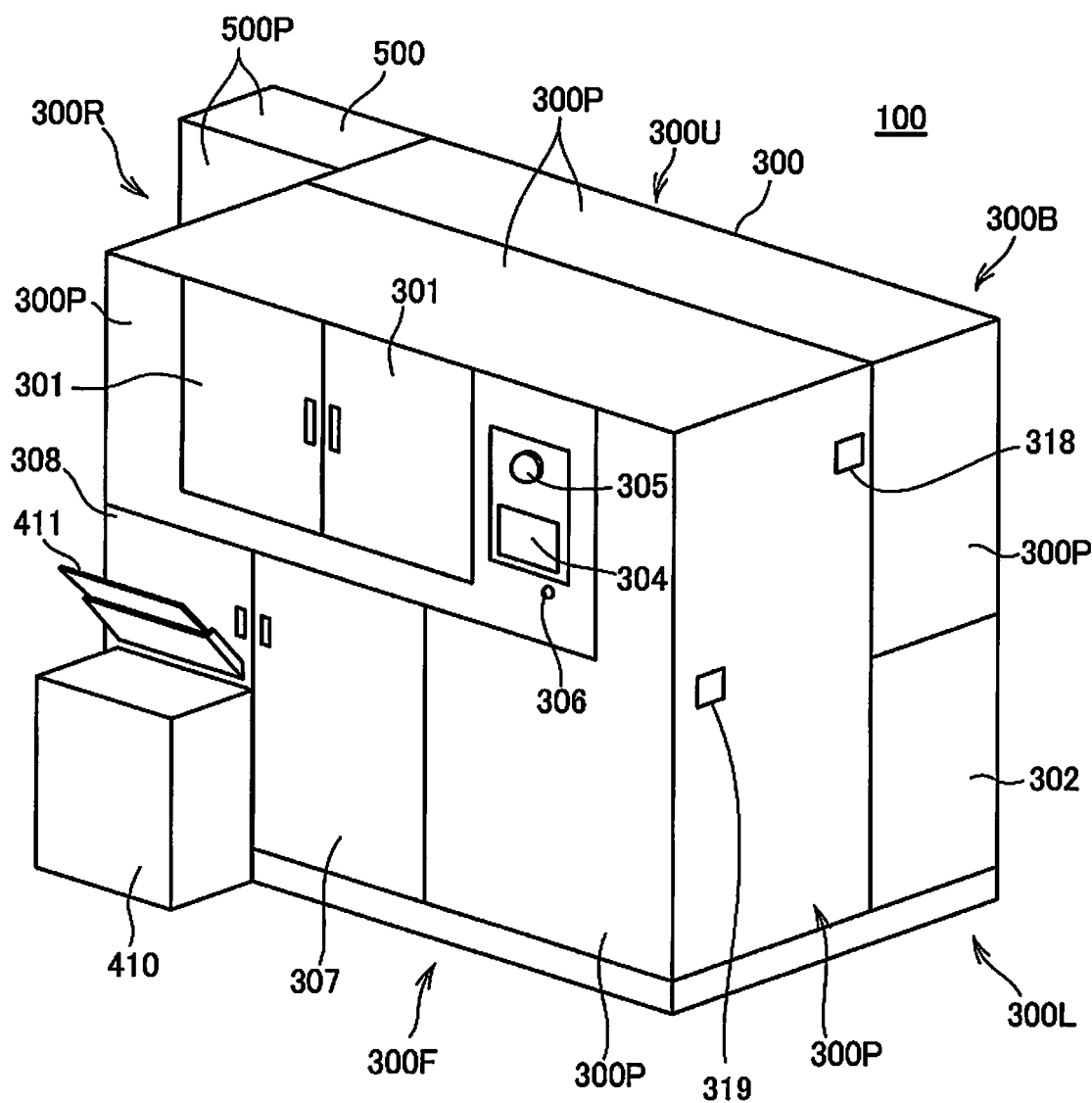
FIG. 1 is a perspective view of an external appearance of a sheet manufacturing apparatus.

FIG. 1 is a perspective view of an external appearance of a sheet manufacturing apparatus 100 to which the present invention is applied.

For example, the sheet manufacturing apparatus 100 described in the embodiment is an apparatus that is suitable for defibrating used waste paper such as confidential paper as a raw material in a dry method such that the paper is fiberized and, then, manufacturing new paper through pressurization, heating, and cutting. The fiberized raw material is mixed with various additives, and thereby bond strength or a whiteness level of a paper product may improve or a function of coloring, scenting, or flame resisting may be added, depending on a use. In addition, forming is performed by controlling density, a thickness, and a shape of paper, and thereby it is possible to manufacture paper having various thicknesses or sizes, depending on a use such as office paper having an A4 or A3 size or business card paper.

As shown in FIG. 1, the sheet manufacturing apparatus 100 includes a substantially rectangular parallelepiped-shaped housing 300 and an electrical unit housing 500. An opening/closing door 301 (door) provided with a handle is disposed on one surface of the housing 300. The opening/closing door 301 is a door that can be manually opened and closed by an operator (user) of the sheet manufacturing apparatus 100. In addition, covers 307 and 308 are installed below the opening/closing door 301. The covers 307 and 308 have respective handle and are doors that can be manually opened and closed by the operator.

A touch panel 304, an emergency stop button 305, a power switch 306, and the covers 307 and 308 are disposed on the same surface of the housing 300 as the surface on which the opening/closing door 301 is disposed. The panel, the button, the switch, and the covers are all operated by the operator of the sheet manufacturing apparatus 100.

The front cover 307 is capable of coming into the opened state only in a state of being unlocked by a locking mechanism (not shown). When the front cover 307 comes into an opened state, an in-device tank 423 (FIG. 4) or the like provided inside the housing 300 is exposed.

In addition, when the opening/closing door 301 comes into an opened state, a resin cartridge accommodating portion 402 (FIG. 4) provided inside the housing 300 is exposed. The resin cartridge accommodating portion 402 detachably houses resin cartridges 403 (FIG. 4) in which additives containing a plurality of color resins are stored, respectively. The opening/closing door 301 is formed of a colorless transparent or colored transparent material, and thus a user is able to visually recognize a state of the resin cartridge 403 housed in the resin cartridge accommodating portion 402 without opening the opening/closing door 301.

The surface on which the opening/closing door 301, the touch panel 304, the emergency stop button 305, the power switch 306, and the covers 307 and 308 are provided, is set as a front surface (face surface) 300F. A surface (opposite surface) on a side opposite to the front surface 300F is set as a rear surface (back surface) 300B. In addition, a surface on the right side of the housing 300 is set as a right-side surface 300R, and a surface on the left side thereof is set as a left-side surface 300L. Here, the right and left sides of the housing 300 indicates the right side and the left side in a direction toward the rear surface 300B. In addition, as shown in FIG. 1, a side on which the opening/closing door 301 is provided in a vertical direction of the housing 300 is set as an upper side, and a reference sign 300U represents an upper surface (top surface).

The front surface 300F, the rear surface 300B, the right-side surface 300R, the left-side surface 300L, and the upper surface 300U of the housing 300 are covered with an exterior panel 300P except for a part thereof. The opening/closing door 301 and the covers 307 and 308 are installed on openings provided in the front surface 300F. The exterior panel 300P is formed of a plate made of metal, synthetic resin, fiber-reinforced plastic, paper, or wood. A surface of the exterior panel 300P may be subjected to a surface treatment such as painting or plating, or a sheet may adhere to the surface.

Front, rear, right, left, top, and bottom surfaces of the electrical unit housing 500 is covered with an exterior panel 500P. Similarly to the exterior panel 300P, the exterior panel 500P is formed of a plate made of metal, synthetic resin, fiber-reinforced plastic, paper, or wood. A surface of the exterior panel 500P may be subjected to a surface treatment such as painting or plating, or a sheet may adhere to the surface.

The touch panel 304, the emergency stop button 305, and the power switch 306 are disposed in an integrated manner on the right side of the opening/closing door 301. The touch panel 304 has a configuration in which a display screen such as a liquid crystal panel and a touch sensor that detects a touch operation on the display screen are disposed to overlap each other. The touch panel 304 displays an image for an operation and detects a touch operation on the image for the operation by the operator, thereby, functioning as a graphical user interface (GUI). The touch panel 304 also functions as a display unit on which various items of information about the sheet manufacturing apparatus 100 are displayed.

The emergency stop button 305 is a push button type switch for instructing a stop of an operation of the sheet manufacturing apparatus 100 and is used to instruct an urgent stop of a process during execution of the corresponding process of manufacturing a sheet by the sheet manufacturing apparatus 100. The power switch 306 is a switch for instructing a start-up or a stop of the sheet manufacturing apparatus 100.

The sheet manufacturing apparatus 100 includes a paper feed stacker 410 (raw material supply unit) that is installed in a state of projecting from the cover 308 on the front surface 300F. The paper feed stacker 410 is a device in which used paper is accommodated as a raw material. When a sheet is manufactured, the used paper accommodated in the paper feed stacker 410 is supplied inside the housing 300 by predetermined means. A paper feed tray 411 for supplying sheets of used paper, which are manually fed, one by one or a plurality of sheets of used paper, which are set, one by one into the inside of the housing is mounted above the paper feed stacker 410. The cover 308 is provided with an opening that allows the paper feed tray 411 to project.

The sheet manufacturing apparatus 100 includes the electrical unit housing 500 that is connected to the right-side surface 300R of the housing 300. The electrical unit housing 500 accommodates a power circuit that supplies electric power source to devices which are accommodated in the housing 300. The sheet manufacturing apparatus 100 includes drive units such as a plurality of fans, blowers, or motors and a load such as a humidifier. The power circuit accommodated in the electrical unit housing 500 includes an inverter circuit or an AC/DC converter for supplying electric power source to the drive units or the load included in the housing 300 and is configured of a power semiconductor element or the like. It is preferable that the electrical unit housing 500 be configured to be separable from the housing 300 as a separate housing from the housing 300, in order to enhance efficiency of heat release of the element that configures the power circuit or in order to simplify installation of the sheet manufacturing apparatus 100.

An opening/closing door 302 is provided on a surface of the housing 300 on a side of the left-side surface 300L. The opening/closing door 302 is a door that can be manually opened and closed, is configured as a part of the exterior panel 300P, and is formed of the same material as that of the exterior panel 300P. In a state in which the opening/closing door 302 is opened, a dust collecting unit 27 to be described below is exposed. The opening/closing door 302 is opened and closed during maintenance for removing dust trapped in the dust collecting unit 27.

Figure 2:
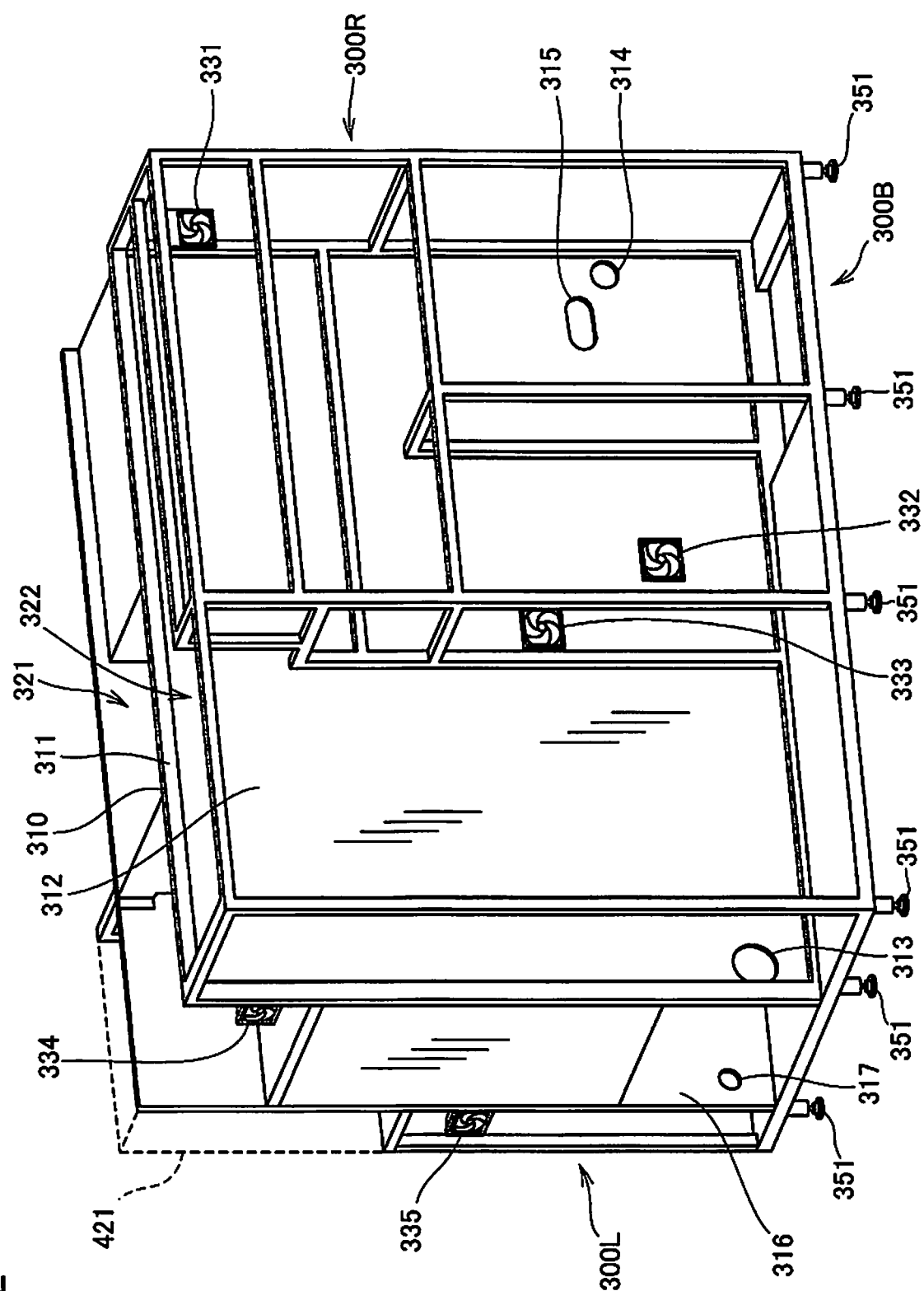
FIG. 2 is a perspective view showing a configuration of a housing.

FIG. 2 is a perspective view showing a configuration of the housing 300. FIG. 2 is a view showing a state in which the exterior panel 300P of the housing 300 and instruments which are accommodated in the housing 300 are excluded, when viewed from the side of the rear surface 300B.

The housing 300 has a structure in which the exterior panel 300P is fixed to a frame 310. As shown in FIG. 2, the frame 310 forms a framework (frame) of the housing 300. The frame 310 is configured of a bar or a pipe which is made of metal or synthetic resin. The frame 310 forms a substantially rectangular parallelepiped-shaped framework so as to match the external shape of the housing 300; however, the frame is provided with a recessed portion for installing a control unit 421 to be described below on one corner on the side of the front surface 300F.

A plurality of legs 351 are provided under the frame 310, each leg 351 is in contact with an installation surface of the housing 300 (sheet manufacturing apparatus 100) so as to support the housing 300. The installation surface is a floor of an installation place of the sheet manufacturing apparatus 100, and it is preferable that the installation surface be a flat surface. The legs 351 may each be configured to have an adjuster that is capable of adjusting a height, or some legs 351 may each be configured to have a caster having a wheel.

The frame 310 is provided with a center frame 311 that is positioned substantially at the center in a front-rear direction of the housing 300. The center frame 311 configures a frame that is expanded in the vertical direction (from the upper surface 300U to the leg 351) and in a right-left direction (from the right-side surface 300R to the left-side surface 300L) of the housing 300. A partition plate 312 is fixed to the center frame 311.

The partition plate 312 configures a surface extending to substantially both ends in the vertical direction and the right-left direction of the housing 300 along the center frame 311. The partition plate 312 partitions in internal space surrounded by the exterior panel 300P of the housing 300 into a front section 321 and a rear section 322.

The partition plate 312 is formed of a plate made of metal, synthetic resin, fiber-reinforced plastic, paper, or wood and partitions the internal space of the housing 300 such that ventilation between at least the front section 321 and the rear section 322 is not freely performed. Consequently, the front section 321 and the rear section 322 are thermally blocked from each other by the partition plate 312. In addition, the partition plate 312 may include a thermal insulator using polyurethane, fiberglass, polystyrene, or natural fiber in order to enhance thermal insulation effect between the front section 321 and the rear section 322.

The partition plate 312 is provided with vent holes 313, 314, and 315. The vent holes 313, 314, and 315 are openings drilled in the partition plate 312, and an air current circulates between the front section 321 and the rear section 322 through the openings.

The vent hole 313 is open in a lower portion on the side of the left-side surface 300L, and the vent hole 314 and the vent hole 315 are open in a lower portion on the side of the right-side surface 300R.

The housing 300 includes exhaust fans 331, 332, 333, 334, and 335. The exhaust fans 331, 332, and 333 are fans for emitting air from the exterior panel 300P of the rear surface 300B and configure exhaust units of the present invention. The exhaust fans 334 and 335 are fans for emitting air from the exterior panel 300P on the side of the left-side surface 300L. The exhaust fans 331 to 335 are each fixed to the frame 310; however, the exhaust fans may be fixed to the exterior panel 300P.

The exterior panel 300P is provided with exhaust holes at positions matching respective positions of the exhaust fans 331 to 335, it is possible to release air by the exhaust fans 331 to 335 to the outside of the housing 300 (sheet manufacturing apparatus 100) through the exhaust holes. For example, FIG. 1 shows an exhaust hole 318 that is provided to match the position of the exhaust fan 334 and an exhaust hole 319 that is provided to match the position of the exhaust fan 335.

At least some of the members of the sheet manufacturing apparatus 100, which are accommodated in the housing 300, emits heat as the members are operated, and the heat is released out of the housing 300 through the exhaust fans 331 to 335.

The housing 300 is provided with at least a plurality of openings, through which suction can be performed, on the side of the front surface 300F and in the right-side surface 300R. For example, suction can be performed through the opening formed in the cover 308 so as to allow the paper feed stacker 410 to project. Air release by the exhaust fans 331 to 335 allows the sheet manufacturing apparatus 100 to generate the air current causing suction from the front surface 300F and the right-side surface 300R and the air release from the rear surface 300B and the left-side surface 300L.

The air current through the housing 300 from the front surface 300F to the rear surface 300B flows through the vent holes 313, 314, and 315 of the partition plate 312. In other words, the vent holes 313, 314, and 315 are used for ventilation from the front section 321 to the rear section 322, and thus an air current for dissipating heat flows from the front section 321 to the rear section 322. Hence, heat generated inside the housing 300 is released from the front section 321 to the rear section 322, and transmission of heat from the rear section 322 to the front section 321 is suppressed.

In addition, a partition plate 316 is fixed to the frame 310 more on the side of the front surface 300F than the partition plate 312. The partition plate 316 is not a plate that completely partitions the internal space of the housing 300 and has a small heat shielding effect unlike the partition plate 312. The partition plate 316 is provided with a vent hole 317 through which the air current flows from the side of the front surface 300F toward the side of the rear surface 300B.

Figure 3:
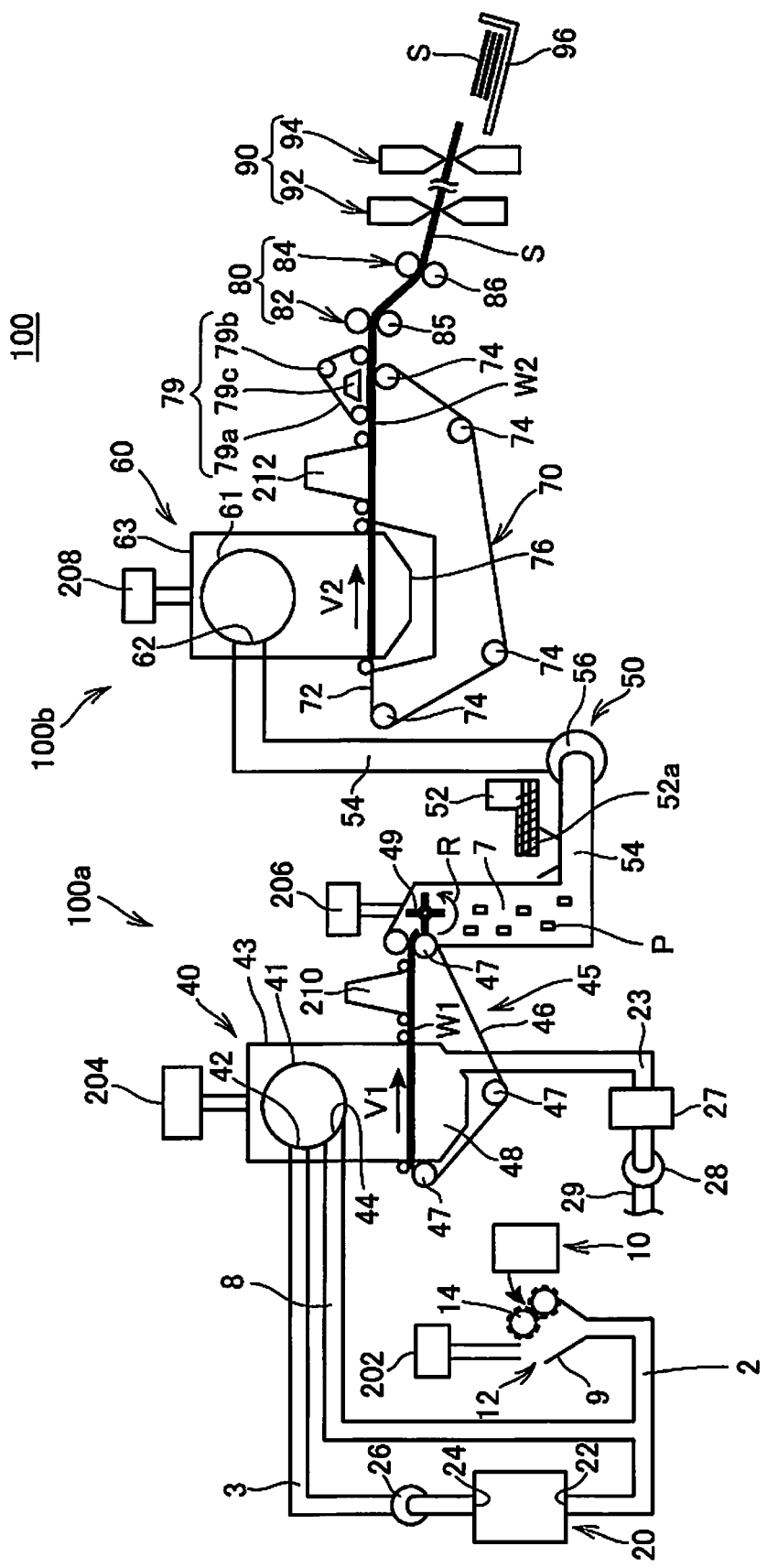
FIG. 3 is a schematic view showing a configuration and an operation of the sheet manufacturing apparatus.

FIG. 3 is a schematic view showing a configuration and an operation of the sheet manufacturing apparatus according to the embodiment.

As shown in FIG. 3, the sheet manufacturing apparatus 100 includes a supply unit 10, a rough crushing unit 12, a defibration unit 20, a sorting unit 40, a first web former 45, a rotary body 49, a mixer 50, an accumulation unit 60, a second web former 70, a conveying unit 79, a pressurizing/heating unit 80, and a cutter 90.

In addition, the sheet manufacturing apparatus 100 includes humidifying units 202, 204, 206, 208, 210, and 212 for the purpose of humidifying the raw material and/or a space through which the raw material moves. The humidifying units 202, 204, 206, 208, 210, and 212 have any specific configurations, and examples thereof include a steam type, a vaporization type, a hot air vaporization type, an ultrasound type, or the like.

In the embodiment, the humidifying units 202, 204, 206, and 208 are each configured of a vaporization type or hot air vaporization type humidifier. In other words, each of the humidifying units 202, 204, 206, and 208 has a filter (not shown) into which water infiltrates and causes air to pass through the filter, thereby supplying humidified air having high humidity.

In addition, in the embodiment, the humidifying unit 210 and the humidifying unit 212 are each configured of an ultrasound type humidifier. In other words, each of the humidifying units 210 and 212 has a vibrating unit (not shown), which atomizes water, and supplies mist generated by the vibrating unit.

The supply unit 10 supplies the raw material to the rough crushing unit 12. For example, any material may be used as the raw material of the sheet that is manufactured by the sheet manufacturing apparatus 100 as long as the material contains fiber, and examples of the raw material include paper, pulp, a pulp sheet, fabric containing nonwoven fabric, woven fabric, or the like. The embodiment employs a configuration in which the sheet manufacturing apparatus 100 uses used paper as the raw material. In the embodiment, the supply unit 10 is configured to deliver the used paper from the paper feed stacker 410 to the rough crushing unit 12.

The rough crushing unit 12 has rough crushing blades 14 that cuts (roughly crushes) the raw material supplied by the supply unit 10 into rough-crushed pieces. The rough crushing blades 14 cut the raw material in a gas atmosphere such as in the atmosphere (in the air). For example, the rough crushing unit 12 includes a pair of rough crushing blades 14, which pinches and cuts the raw material, and a drive unit, which rotates the rough crushing blades 14, and the rough crushing unit can have the same configuration as that of a so-called shredder. The rough-crushed pieces may have any shape or size as long as the shape or size is suitable for a defibrating process in the defibration unit 20. For example, the rough crushing unit 12 cuts the raw material into paper pieces having a size equal to or smaller than 1 square centimeter to several square centimeters.

The rough crushing unit 12 has a chute (hopper) 9 that receives the rough-crushed pieces which are cut by the rough crushing blades 14 and fall down. For example, the chute 9 has a tapered shape having a width that is gradually decreased, in a direction (proceeding direction) in which the rough-crushed pieces flow. Therefore, the chute 9 is capable of receiving a large amount of rough-crushed pieces. A pipe 2 that communicates with the defibration unit 20 is connected to the chute 9, and the pipe 2 forms a conveying channel for conveying the raw material (rough-crushed pieces) cut by the rough crushing blades 14 to the defibration unit 20. The rough-crushed pieces are gathered by the chute 9 and are conveyed (transported) to the defibration unit 20 through the pipe 2.

The humidifying unit 202 supplies humidified air to the chute 9 or the vicinity of the chute 9 included in the rough crushing unit 12. Consequently, it is possible to suppress a phenomenon in which rough-crushed materials cut by the rough crushing blades 14 are attached to an inner surface of the chute 9 or the pipe 2 due to static electricity. In addition, the rough-crushed materials cut by the rough 00R rightlades 14 are transported together with humidified air (having high humidity) to the defibration unit 20, and thus it is also possible to expect an effect of suppressing attachment of a defibrated substance to an inside of the defibration unit 20. In addition, the humidifying unit 202 may be configured to supply the humidified air to the rough crushing blades 14 so as to remove electricity from the raw material that is supplied by the supply unit 10. In addition, an ionizer together with the humidifying unit 202 may remove electricity.

The defibration unit 20 performs a defibrating process on the raw material (rough-crushed pieces) cut by the rough crushing unit 12 and generates the defibrated substance. Here, "to defibrate" means to unravel fibers one by one from the raw material (defibration target object) in which a plurality of fibers are bound. The defibration unit 20 also has a function of separating a substance such as a resin grain, ink, toner, or a bleeding preventive agent, which is attached to the raw material, from the fiber.

A substance having passed through the defibration unit 20 is referred to as the "defibrated substance". The "defibrated substance" includes a resin (resin for binding a plurality of fibers to each other) grain, a coloring agent such as ink or toner, or an additive such as a bleeding preventive agent or a paper strengthening agent, which is separated from the fiber when the fiber is unraveled, in addition to an unraveled defibrated fiber, in some cases. The unraveled defibrated substance which has a string shape or a ribbon shape. The unraveled defibrated substance may be present in a state in which the substance is not intertwined with another unraveled fiber (an independent state) or may be present in a state in which the substance is intertwined with another unraveled defibrated substance into a blocking shape (a state of forming a so-called "clump".

The defibration unit 20 performs dry defibration. Here, defibration performed through a process of defibration not in a liquid but in a gas such as in the atmosphere (in the air) is referred to as the dry defibration. In the embodiment, the defibration unit 20 is configured of an impeller mill. Specifically, the defibration unit 20 includes a rotor (not shown) that rotates at a high speed and a liner (not shown) that is positioned along an outer circumference of the rotor. The rough-crushed pieces that have been roughly crushed by the rough crushing unit 12 are sandwiched between the rotor and the liner of the defibration unit 20 so as to be defibrated. The defibration unit 20 generates an air current due to the rotation of the rotor. The air current enables the defibration unit 20 to suction the rough-crushed pieces which are the raw material from the pipe 2 and convey the defibrated substance to a discharge port 24. The defibrated substance is delivered to a pipe 3 from the discharge port 24 and is transported to the sorting unit 40 via the pipe 3 (defibrated substance transport pipe).

In this manner, the defibrated substance that is generated in the defibration unit 20 is conveyed to the sorting unit 40 from the defibration unit 20 due to the air current that is generated by the defibration unit 20. Further, in the embodiment, the sheet manufacturing apparatus 100 includes a defibration unit blower 26 that is an air current generating device, and the defibrated substance is conveyed to the sorting unit 40 due to the air current generated by the defibration unit blower 26. As shown in FIG. 2, the defibration unit blower 26 is attached to the pipe 3, suctions air together with the defibrated substance from the defibration unit 20, and performs blowing to the sorting unit 40.

The sorting unit 40 is provided with an introduction port 42 into which the defibrated substance defibrated by the defibration unit 20 flows along with the air current from the pipe 3. The sorting unit 40 sorts the defibrated substance introduced to the introduction port 42 depending on a length of fiber. To be more specific, the sorting unit 40 sorts a defibrated substance having a size equal to or smaller than a predetermined size into a first sorted substance, and a defibrated substance that is larger than the first sorted substance into a second sorted substance, of defibrated substances defibrated by the defibration unit 20. The first sorted substance includes a fiber, a grain, or the like, and a second sorted substance includes a long fiber, an incompletely defibrated piece (rough-crushed piece that is not sufficiently defibrated), a clump formed by clumping or entwining the defibrated fibers, or the like.

In the embodiment, the sorting unit 40 has a drum portion (sieve portion) 41 and a housing portion (cover portion) 43 that accommodates the drum portion 41.

The drum portion 41 is a cylinder sieve that is rotatably driven by a motor. The drum portion 41 has a net (a filter or a screen) and functions as a sieve. The drum portion 41 sorts into the first sorted substance smaller than a size of a mesh opening (opening) of the net and the second sorted substance larger than the mesh opening of the net, by meshes of the net. Examples of the net of the drum portion 41 include a wire mesh, expanded metal obtained by expanding a metal plate provided with cuts, or punched metal provided with holes formed in a metal plate by a press machine.

The defibrated substance introduced into the introduction port 42 is delivered along with the air current into the inside of the drum portion 41, and the first sorted substance falls downward from the mesh of the net of the drum portion 41 due to the rotation of the drum portion 41. The second sorted substance that cannot pass through the mesh of the net of the drum portion 41 flows to be guided to an outlet 44 and is delivered to a pipe 8 along with the air current flowing to the drum portion 41 from the introduction port 42.

The pipe 8 connects the inside of the drum portion 41 to the pipe 2. The second sorted substance flowing through the pipe 8 flows to the pipe 2 along with the rough-crushed pieces that have been roughly crushed by the rough crushing unit 12 and is guided to an introduction port 22 of the defibration unit 20. Consequently, the second sorted substance returns to the defibration unit 20 and is obtained through a defibrating process.

In addition, the first sorted substances sorted by the drum portion 41 are dispersed in the air through the meshes of the net of the drum portion 41 and drop toward a mesh belt 46 of the first web former 45 that is positioned below the drum portion 41.

The first web former 45 (separation unit) includes the mesh belt 46 (separation belt), a stretching roller 47, and a suction unit (suction mechanism) 48. The mesh belt 46 is an endless belt, is suspended on three stretching rollers 47, and is conveyed along with motion of the stretching rollers 47 in a direction represented by an arrow in the drawing. The mesh belt 46 has a surface configured of a net in which openings having a predetermined size are arranged. Among the first sorted substances dropping from the sorting unit 40, fine particles having a size to the extent that it is possible to pass through the mesh of the net fall downward from the mesh belt 46, and fibers having a size to the extent that it is not possible to pass through the mesh of the net are accumulated on the mesh belt 46 and are conveyed along with the mesh belt 46 in an arrow direction. The fine particles falling from the mesh belt 46 include a relatively small substance or a substance having low density (such as a resin grain, a coloring agent, or an additive) of the defibrated substances and are substances to be removed, which are not used in manufacturing of a sheet S by the sheet manufacturing apparatus 100.

The mesh belt 46 moves at a constant speed V1 at the time of a normal operation of manufacturing the sheet S. Here, the time of the normal operation means a time of an operation excluding times of execution of start control and stop control of the sheet manufacturing apparatus 100 to be described below and, to be more specific, indicates while the sheet manufacturing apparatus 100 manufactures the sheet S having a desired quality.

Hence, the defibrated substances obtained through the defibrating process by the defibration unit 20 are sorted into the first sorted substances and the second sorted substances by the sorting unit 40, and the second sorted substances return to the defibration unit 20. In addition, the first web former 45 removes the substance to be removed from the first sorted substances. The rest of the first sorted substances obtained by removing the substance to be removed are materials suitable for manufacturing the sheet S, and the materials are accumulated on the mesh belt 46 so as to form a first web W1.

The suction unit 48 suctions air from below the mesh belt 46. The suction unit 48 is connected to a dust collecting unit 27 (trapping unit) via a pipe 23. The dust collecting unit 27 is a filter-type or cyclone-type dust collecting device and separates fine particles from the air current. A trapping blower 28 (suction unit) is installed downstream of the dust collecting unit 27, and the trapping blower 28 suctions air from the dust collecting unit 27. In addition, a part of the air discharged by the trapping blower 28 is sent to vaporization-type humidifiers 441, 442, and 443 (FIG. 9) to be described below, and the rest of the air is discharged outside the sheet manufacturing apparatus 100.

In this configuration, air from the suction unit 48 is suctioned by the trapping blower 28 through the dust collecting unit 27. In the suction unit 48, the fine particles that pass through the meshes of the net of the mesh belt 46 are suctioned along with the air and are set to the dust collecting unit 27 through the pipe 23. The dust collecting unit 27 separates the fine particles having passed through the mesh belt 46 from the air current so as to accumulate the fine particles.

Hence, fibers obtained by removing the substances to be removed from the first sorted substance are accumulated on the mesh belt 46 such that the first web W1 is formed. The trapping blower 28 performs suction, thereby, promoting to form the first web W1 on the mesh belt 46, and the substances to be removed are rapidly removed.

The humidified air generated by the humidifying unit 204 is supplied to a space including the drum portion 41. The first sorted substance is humidified with the humidified air inside the sorting unit 40. Consequently, it is possible to weaken attachment of the first sorted substance to the mesh belt 46 due to an electrostatic force and peel the first sorted substance from the mesh belt 46 easily. Further, it is possible to suppress attachment of the first sorted substance to an inner wall of the rotary body 49 or the housing portion 43 due to the electrostatic force. In addition, the suction unit 48 is capable of suctioning the substance to be removed efficiently.

In the sheet manufacturing apparatus 100, a configuration of sorting and separating the first sorted substance and the second sortedsubstance from each other is not limited to the sorting unit 40 that includes the drum portion 41. For example, a configuration may be employed, in which the defibrated substances obtained through the defibrating process by the defibration unit 20 are classified by a classifier. For example, it is possible to use a cyclone classifier, an elbow jet classifier, or an eddy classifier as the classifier. When the classifiers are used, it is possible to sort and separate the first sorted substance and the second sorted substance from each other. Further, the classifier can realize a configuration of separating and removing the substance to be removed, which includes a relatively small substance or a substance having low density (such as a resin grain, a coloring agent, or an additive) of the defibrated substances. For example, in the configuration, the fine particles contained in the first sorted substance may be removed from the first sorted substance by the classifier. In this case, it is possible to employ a configuration in which the second sorted substance returns to the defibration unit 20, for example, the substances to be removed are collected by the dust collecting unit 27, and the first sorted substance is sent to a pipe 54 (first sorted substance transport pipe) without the substances to be removed.

In a conveyance route of the mesh belt 46, the humidifying unit 210 supplies air containing mist to a downstream side of the sorting unit 40. The mist which is fine particles of water generated by the humidifying unit 210 drops toward the first web W1 and supplies moisture to the first web W1. Consequently, it is possible to adjust an amount of moisture contained in the first web W1, and thus it is possible to suppress attachment or the like of a fiber to the mesh belt 46 due to the static electricity.

The sheet manufacturing apparatus 100 includes the rotary body 49 that divides the first web W1 accumulated on the mesh belt 46. The first web W1 is peeled from the mesh belt 46 and is divided by the rotary body 49 at a position at which the mesh belt 46 is bent by the stretching roller 47.

The first web W1 is a soft material having a web shape, which is formed of the accumulated fibers, and the rotary body 49 loosens the fibers of the first web W1 so as to perform a process of proceeding to a state in which it is easy to mix a resin with the fibers by the mixer 50 to be described below.

The rotary body 49 has any configuration; however, in the embodiment, it is possible to have a rotating vane shape by having a plate-shaped vane that rotates. The rotary body 49 is disposed at a position at which the vane comes into contact with the first web W1 peeled from the mesh belt 46. The rotary body 49 rotates (for example, rotates in a direction represented by an arrow R in the drawing), and thereby the vane collides with the first web W1, which is peeled from the mesh belt 46 so as to be conveyed, such that the first web is divided, and a subdivided body P is generated.

It is preferable that the rotary body 49 be installed at a position at which the vane of the rotary body 49 does not collide with the mesh belt 46. For example, it is possible to have a gap of 0.05 mm or larger and 0.5 mm or smaller between a distal end of the vane of the rotary body 49 and the mesh belt 46. In this case, it is possible to divide the first web W1 efficiently without damage to the mesh belt 46 by the rotary body 49.

The subdivided body P divided by the rotary body 49 drops to an inside of a pipe 7 so as to be transported (conveyed) to the mixer 50 along with an air current flowing in the inside of the pipe 7.

In addition, the humidified air generated by the humidifying unit 206 is supplied to a space including the rotary body 49. Consequently, it is possible to suppress a phenomenon in which the fibers are attached to the inside of the pipe 7 or the vane of the rotary body 49 due to static electricity. In addition, air having high humidity is supplied to the mixer 50 through the pipe 7, and thus it is possible to suppress an influence of the static electricity even in the mixer 50.

The mixer 50 communicates with an additive supply unit 52 that supplies an additive containing resin and the pipe 7 and includes the pipe 54, through which an air current containing the subdivided body P flows, and a mixing blower 56 (transport blower).

The subdivided body P is a fiber obtained by removing the substance to be removed from the first sorted substance having passed through the first sorting unit 40 as described above. The mixer 50 mixes the fiber configuring the subdivided body P and an additive containing resin.

In the mixer 50, the subdivided body P and the additive are conveyed while the mixing blower 56 generates an air current, and the subdivided body P and the additive are mixed in the pipe 54. In addition, the subdivided body P is loosened in a process of flowing inside the pipe 7 and the pipe 54 so as to have a finer fiber shape.

The additive supply unit 52 (resin container) is connected to the resin cartridge 403, in which the additive is accumulated, and supplies the additive inside the resin cartridge 403 to the pipe 54. The additive supply unit 52 temporarily stores the additive made of fine powder or fine particles inside the resin cartridge 403. The additive supply unit 52 includes a discharge unit 52a (resin supply unit) for sending the temporarily stored additive to the pipe 54. The discharge unit 52a is provided with a feeder (not shown) for delivering the additive stored in the additive supply unit 52 to the pipe 54 and a shutter (not shown) for opening and closing a pipe channel through which the feeder is connected to the pipe 54. When the shutter is closed, for example, a pipe channel, through which the discharge unit 52a is connected to the pipe 54, or an opening is blocked, and thus supply of the additive from the additive supply unit 52 to the pipe 54 is stopped.

In a state in which the feeder of the discharge unit 52a does not operate, the additive is not supplied to the pipe 54 from the discharge unit 52a; however, in a case or the like where a pressure in the pipe 54 is a negative pressure, there is a possibility that the additive will flow to the pipe 54 even when the discharge unit 52a is stopped. The discharge unit 52a is closed, and thereby it is possible to reliably block the flowing of the additive.

The additive that is supplied by the additive supply unit 52 includes a resin for binding a plurality of fibers. The resin is a thermoplastic resin or a thermosetting resin, and examples thereof include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, or polyether ether ketone. The resins above may be used individually or in a proper combination thereof. In other words, the additive may contain a single substance, may be a mixture, or may contain a plurality of types of particles that are each configured of a single or a plurality of substances. In addition, the additive may be have a fiber shape or a powder shape.

The resin contained in the additive is melted by being heated so as to cause a plurality of fibers to be bounded to each other. Hence, in a state in which the resin is mixed with the fibers, and the resin is not heated to a temperature at which the resin is melted, the fibers are not bound to each other.

In addition, an additive that is supplied by the additive supply unit 52 may contain a colorant for coloring the fibers, a clumping inhibitor for inhibiting the fibers from clumping or the resin from clumping, or a flame retardant for retarding progression of burning of fibers or the like, depending on a type of sheet to be manufactured, in addition to the resin that causes the fibers to be bound. In addition, an additive that does not contain the colorant may be colorless or have a light color to the extent that the resin looks colorless or may be white.

The subdivided body P dropping through the pipe 7 and the additive that is supplied by the additive supply unit 52 are suctioned to the inside of the pipe 54 due to the air current generated by the mixing blower 56 and pass through the inside of the mixing blower 56. An action of the air current generated by the mixing blower 56 and/or a rotary unit such as the vane included in the mixing blower 56 causes the additive and the fiber configured of the subdivided body P to be mixed, and a mixture (mixture of the first sorted substance and the additive) is transported to the accumulation unit 60 through the pipe 54.

A mechanism that mixes the first sorted substance and the additive is not particularly limited, and a mechanism that performs agitation by a vane which rotates at a high speed may be employed, or a mechanism of using rotation of a container such as a V-shaped mixer may be employed, and the mechanism may be installed in front or rear of the mixing blower 56.

The accumulation unit 60 introduces the mixture having passed through the mixer 50 from an introduction port 62 and loosens intertwined defibrated substances (fibers) so as to be dropped while the fibers are dispersed in the air. Further, in a case where the additive that is supplied from the additive supply unit 52 has a fiber shape, the accumulation unit 60 loosens the intertwined additives. Consequently, the accumulation unit 60 is capable of accumulating the mixture in the second web former 70 with good uniformity.

In the embodiment, the accumulation unit 60 has a drum portion 61 (drum) and a housing portion (cover portion) 63 that accommodates the drum portion 61. The drum portion 61 is a cylinder sieve that is rotatably driven by a motor. The drum portion 61 has a net (a filter or a screen) and functions as a sieve. The drum portion 61 allows fibers or particles that are smaller than a mesh opening (opening) of the net through the mesh of the net and to be dropped from the drum portion 61. For example, a configuration of the drum portion 61 is the same as the configuration of the drum portion 41.

The "sieve" of the drum portion 61 may not have a function of sorting a specific target object. In other words, the "sieve" used as the drum portion 61 means a member having a net, and the drum portion 61 may allow the entire mixture introduced to the drum portion 61 to be dropped.

The second web former 70 is disposed below the drum portion 61. The second web former 70 (web former) accumulates passing substances having passed through the accumulation unit 60, and a second web W2 (accumulated substance) is formed. For example, the second web former 70 includes a mesh belt 72 (belt), a stretching roller 74, and a suction mechanism 76.

The mesh belt 72 is an endless belt, is suspended on a plurality of stretching rollers 74, and is conveyed along with motion of the stretching rollers 74 in a direction represented by an arrow in the drawing. For example, the mesh belt 72 is made of metal, resin, fabric, or nonwoven fabric. The mesh belt 72 has a surface configured of a net in which openings having a predetermined size are arranged. Among the first fibers or particles dropping from the drum portion 61, fine particles having a size to the extent that it is possible to pass through the mesh of the net fall downward from the mesh belt 72, and fibers having a size to the extent that it is not possible to pass through the mesh of the net are accumulated on the mesh belt 72 and are conveyed along with the mesh belt 72 in an arrow direction. The mesh belt 72 moves at a constant speed V2 at the time of a normal operation of manufacturing the sheet S. The time of the normal operation has a meaning as described above.

The mesh belt 72 has minute meshes of the net, and the mesh can have a size so as not to allow most of the fibers or particles dropping from the drum portion 61 to pass through the mesh belt.

The suction mechanism 76 is provided below the mesh belt 72 (on a side opposite to a side of the accumulation unit 60). The suction mechanism 76 includes a dust collecting blower 429 (refer to FIG. 4), and thus it is possible to generate an air current (air current toward the mesh belt 72 from the accumulation unit 60) toward below the suction mechanism 76 with a suction force of the dust collecting blower 429.

Figure 4:
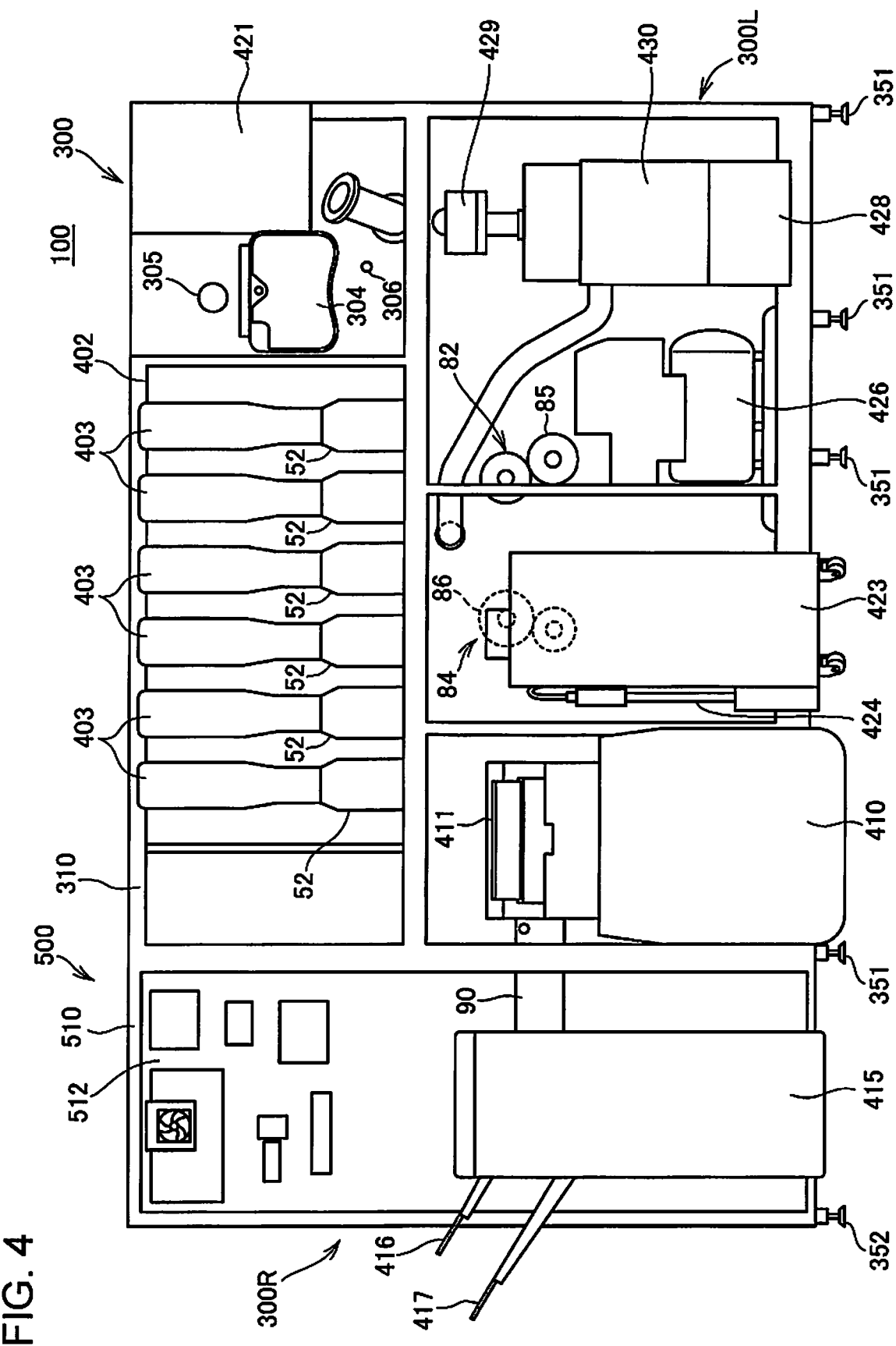
FIG. 4 is a front view of the sheet manufacturing apparatus in a state in which an opening/closing door, a cover, and an exterior panel are excluded.

The suction mechanism 76 suctions mixtures dispersed in the air by the accumulation unit 60 to the mesh belt 72. Consequently, it is possible to promote forming of the second web W2 on the mesh belt 72 and to increase a discharge speed from the accumulation unit 60. Further, the suction mechanism 76 is capable of forming a down flow in a falling route of the mixture and preventing the defibrated substances and the additive from being intertwined during falling. In addition, the suction mechanism 76 of the embodiment discharges the air suctioned by the dust collecting blower 429 to be described below to the outside of the sheet manufacturing apparatus 100 through a filter unit 430 (FIG. 4).

The humidified air generated by the humidifying unit 208 is supplied to a space including the drum portion 61. It is possible to humidify an inside of the accumulation unit 60 with the humidified air, and thus it is possible to suppress the fibers or the particles from being attached to the housing portion 63 due to the electrostatic force, to drop the fibers and the particles rapidly to the mesh belt 72, and to form the second web W2 into a preferable shape.

As described above, through the accumulation unit 60 and the second web former 70 (a web forming step), the second web W2 is formed in a state of containing a large amount of air and being soft and expanded. The second web W2 accumulated on the mesh belt 72 is conveyed to the pressurizing/heating unit 80.

In a conveyance route of the mesh belt 72, the humidifying unit 212 supplies air containing mist to a downstream side of the accumulation unit 60. Consequently, the mist which is generated by the humidifying unit 212 is supplied to the second web W2, and an amount of moisture contained in the second web W2 is adjusted. Consequently, it is possible to suppress attachment or the like of a fiber to the mesh belt 72 due to the static electricity.

The sheet manufacturing apparatus 100 includes the conveying unit 79 that is provided to convey the second web W2 on the mesh belt 72 to the pressurizing/heating unit 80. For example, the conveying unit 79 includes a mesh belt 79a, a stretching roller 79b, and a suction mechanism 79c.

The suction mechanism 79c has a blower (not shown) and generates an upward air current from the mesh belt 79a with a suction force of the blower. The second web W2 is suctioned along with the air current, and the second web W2 is separated from the mesh belt 72 so as to be attached to the mesh belt 79a. The mesh belt 79a moves along with rotation of the stretching roller 79b and conveys the second web W2 to the pressurizing/heating unit 80. For example, a movement speed of the mesh belt 72 is the same as a movement speed of the mesh belt 79a.

In this manner, the conveying unit 79 peels the second web W2 formed on the mesh belt 72 from the mesh belt 72 so as to transport the second web.

The pressurizing/heating unit 80 pressurizes and heats the second web W2 which is accumulated on the mesh belt 72 and conveyed by the conveying unit 79 so as to form the sheet S. In the pressurizing/heating unit 80, fibers of a defibrated substance and an additive which are contained in the second web W2 are heated, and thereby a plurality of fibers in a mixture are bound to each other via the additive (resin).

The pressurizing/heating unit 80 has a pressurizing unit 82 that pressurizes the second web W2 and a heating unit 84 that heats the second web W2 pressurized by the pressurizing unit 82.

The pressurizing unit 82 is configured of a pair of calendar rollers 85 and nips and pressurizes the second web W2 therebetween with a predetermined nip pressure. The second web W2 decreases in thickness by being pressurized, and density of the second web W2 increases. One of the pair of calendar rollers 85 is a drive roller that is driven by a motor (not shown), and the other roller is a driven roller. The calendar roller 85 rotates by a drive force of a motor (not shown) so as to convey the second web W2 having high density due to pressurization toward the heating unit 84.

For example, the heating unit 84 can be configured to use a heating roller (heater roller), a thermal press forming device, a hot plate, a hot air blower, an infrared heater, or a flash fixing device. In the embodiment, the heating unit 84 has a pair of heating rollers 86. The heating rollers 86 are warmed to a preset temperature by a heater that is installed inside or outside. The heating rollers 86 nip the second web W2 pressurized by the calendar roller 85 so as to apply heat to the second web and form the sheet S. In addition, one of the pair of heating rollers 86 is a drive roller that is driven by a motor (not shown), and the other roller is a driven roller. The heating roller 86 rotates by a drive force of a motor (not shown) so as to convey the heated sheet S toward the cutter 90.

The number of the calendar rollers 85 included in the pressurizing unit 82 and the number of the heating rollers 86 included in the heating unit 84 are not particularly limited.

The cutter 90 cuts the sheet S formed by the pressurizing/heating unit 80. In the embodiment, the cutter 90 includes a first cutter 92 that cuts the sheet S in a direction intersecting a conveyance direction of the sheet S and a second cutter 94 that cuts the sheet S in a direction parallel to the conveyance direction. For example, the second cutter 94 cuts the sheet S having passed through the first cutter 92.

As described above, a single sheet S having a predetermined size is formed. The cut single sheet S is discharged to a discharge unit 96. The discharge unit 96 is a functional unit that discharges and stores the sheet S manufactured by the sheet manufacturing apparatus 100, and a paper discharge stacker 415 (FIG. 4) to be described below in the embodiment configures the discharge unit 96.

As shown in FIG. 3, the sheet manufacturing apparatus 100 manufactures the sheet S by using the raw material such as used paper containing fibers. The functional units for manufacturing the sheet S are broadly divided into a fiber generating unit 100a that picks out fibers from the raw material, the mixer 50 that mixes the fibers and the resin, and a sheet former 100b that forms the sheet S from the mixture mixed by the mixer 50. The fiber generating unit 100a includes the rough crushing unit 12, the defibration unit 20, the sorting unit 40, the first web former 45, and the suction unit 48. In addition, the sheet former 100b includes the accumulation unit 60, the second web former 70, the conveying unit 79, the pressurizing/heating unit 80, and the cutter 90.

Figure 9:
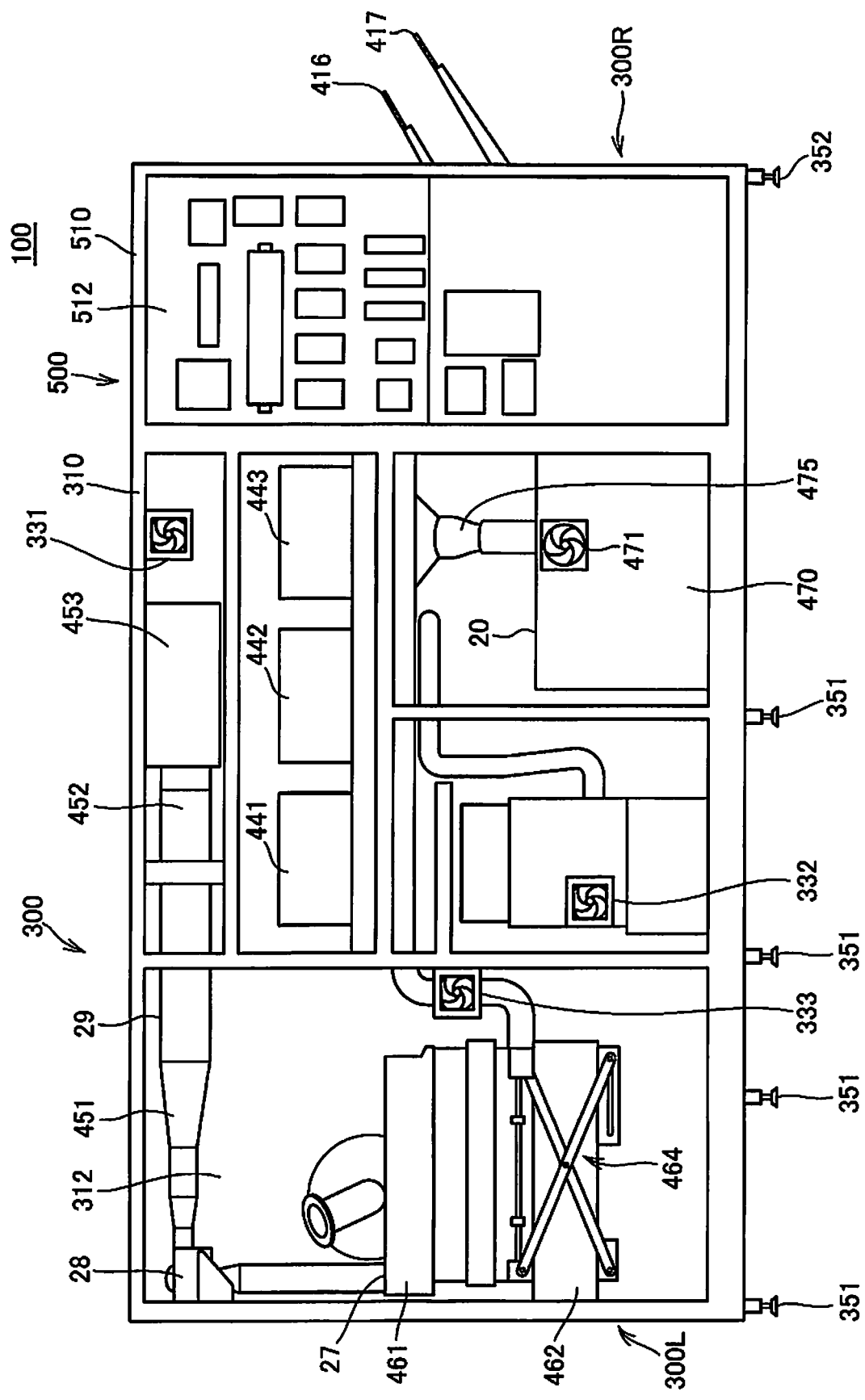
FIG. 9 is a rear view of the sheet manufacturing apparatus in a state in which the exterior panel is excluded.

In the above-described configuration, the humidifying units 202, 204, 206, and 208 may be configured to be vaporization-type humidifiers. In this case, a configuration may be employed, in which humidified air generated by one humidifier diverges to be supplied to the rough crushing unit 12, the housing portion 43, the pipe 7, and the housing portion 63. In the configuration, a duct (not shown), through which the humidified air is supplied, is installed to diverge, and thereby it is possible to easily realize supply of the humidified air. In addition, it is needless to say that the humidifying units 202, 204, 206, and 208 can be each configured of two or three vaporization-type humidifiers. The sheet manufacturing apparatus 100 of the embodiment includes the vaporization-type humidifiers 441, 442, and 443 (FIG. 9). The vaporization-type humidifier 441 blows the humidified air to the humidifying units 202 and 204. In addition, the vaporization-type humidifier 442 blows the humidified air to the humidifying unit 206, and the vaporization-type humidifier 443 blows the humidified air to the humidifying unit 208. The vaporization-type humidifiers 441, 442, and 443 configure a vaporization-type humidifying unit of the present invention.

In addition, in the above-described configuration, the humidifying units 210 and 212 may be configured of one ultrasound type humidifier or may be configured of two ultrasound type humidifier. For example, it is possible to employ a configuration in which air containing mist generated by one humidifier diverges to be supplied to the humidifying unit 210 and the humidifying unit 212. The sheet manufacturing apparatus 100 of the embodiment includes a mist-type humidifier 445 (FIG. 7) to be described below which supplies the air containing the mist to the humidifying units 210 and 212.

In addition, the blowers included in the sheet manufacturing apparatus 100 described above are not limited to the defibration unit blower 26, the trapping blower 28, the mixing blower 56, or the like. For example, it is needless to say that an air blower that assists the blowers described above can be provided to the duct.

In addition, in the above-described configuration, the rough crushing unit 12 first roughly crushes the raw material, and the sheet S is manufactured from the roughly crushed raw material; however, it is also possible to employ a configuration in which the sheet S is manufactured by using the fibers as the raw material.

For example, a configuration may be employed, in which it is possible to feed, as the raw material, fibers equivalent to the defibrated substances obtained through the defibrating process by the defibration unit 20, to the drum portion 41. In addition, a configuration may be employed, in which it is possible to feed, as the raw material, fibers equivalent to the first sorted substances separated from the defibrated substances to the pipe 54. In this case, fibers obtained by processing used paper, pulp, or the like are supplied to the sheet manufacturing apparatus 100, and thereby it is possible to manufacture the sheet S.

Subsequently, disposition state of the members that configure the sheet manufacturing apparatus 100 in the housing 300 will be described.

Figure 5:
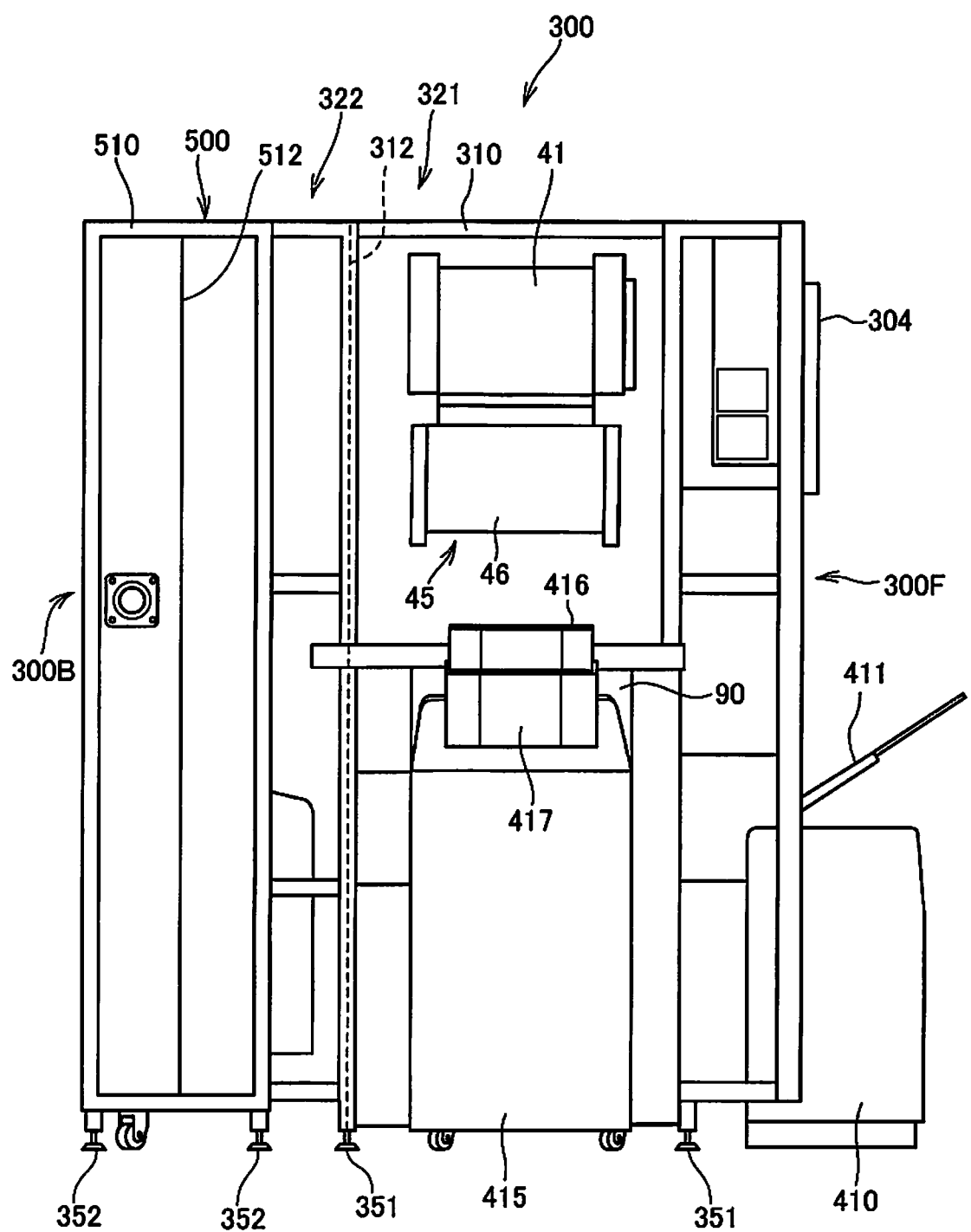
FIG. 5 is a right side view of the sheet manufacturing apparatus in a state in which the exterior panel is excluded.

FIG. 4 is a front view of the sheet manufacturing apparatus 100 and shows a state in which the opening/closing door 301, the covers 307 and 308, the exterior panel 300P, and the exterior panel 500P are excluded. FIG. 4 corresponds to a view of the housing 300 viewed from the side of the front surface 300F. In addition, FIG. 5 is a right side view of the sheet manufacturing apparatus 100 and shows a state in which the exterior panel 300P and the exterior panel 500P are excluded. FIG. 5 corresponds to a view of the housing 300 viewed from the side of the right-side surface 300R.

As shown in FIG. 4, the control unit 421 is disposed on a side of the touch panel 304 and the emergency stop button 305 in the upper portion of the housing 300. The control unit 421 includes a control circuit (not shown), which controls an operation of the sheet manufacturing apparatus 100, internally and functions as a controller of the sheet manufacturing apparatus 100. The control circuit internally provided in the control unit 421 causes a display to be performed on the touch panel 304, detects a touch operation, detects an operation on the emergency stop button 305, detects an operation of power switch 306, and controls the sheet manufacturing apparatus 100 based on the operations.

The resin cartridge accommodating portion 402 is disposed in the upper portion of the housing 300 on the side of the front surface 300F, and a plurality of resin cartridges 403 are mounted to be aligned in the resin cartridge accommodating portion 402. Each of the resin cartridges 403 is connected to the additive supply unit 52. As described above, the additive supply unit 52 is an apparatus that feeds the additive contained in the resin cartridge 403 to the mixer 50 (FIG. 3). The sheet manufacturing apparatus 100 includes a plurality of additive supply units 52 such that the plurality of resin cartridges 403 divided for each color of the additives can be mounted therein. The plurality of additive supply units 52 are disposed along the pipe 54 (FIG. 3). Examples of the color also include a transparent color, in addition to an achromatic color such as white or a chromatic color.

The resin cartridges 403 are attachable to and detachable from the additive supply units 52 and are individually replaceable in a case where the additive is not contained in the resin cartridge 403. The resin cartridges 403 and the additive supply units 52 are disposed to face the opening/closing door 301 (FIG. 1). Therefore, when the opening/closing door 301 shown in FIG. 1 is opened, it is possible to access the resin cartridges 403 from the front surface 300F, and work for mounting the resin cartridge 403 to the additive supply unit 52 or work for replacing the resin cartridge 403 is performed.

The paper feed stacker 410 described above is disposed in a lower portion of the housing 300.

The in-device tank 423 is disposed on a side of the paper feed stacker 410. The in-device tank 423 is a water tank that stores water that is supplied from the outside of the sheet manufacturing apparatus 100. The in-device tank 423 includes water feed nozzle 424. The in-device tank 423 and the water feed nozzle 424 are exposed on a side of the front surface 300F in a state in which the cover 307 (FIG. 1) is opened.

The water feed nozzle 424 is a nozzle connected to the in-device tank 423 and is inserted into a tank or the like outside the sheet manufacturing apparatus 100. The water feed nozzle 424 suctions water by power of a water feed pump (not shown), the suctioned water is delivered into the in-device tank 423 so as to be stored. The in-device tank 423 corresponds to a water supply unit of the present invention, and the water feed nozzle 424 is included in that water supply unit.

The sheet manufacturing apparatus 100 includes a water pump (not shown) that feeds water to the vaporization-type humidifiers 441, 442, and 443 (FIG. 9) and the mist-type humidifier 445 (FIG. 7) to be described below from the in-device tank 423. Consequently, water for humidifying is sent from the in-device tank 423 to the vaporization-type humidifiers 441, 442, and 443 and the mist-type humidifier 445. A configuration may be employed, in which, water is collected to the in-device tank 423 from the vaporization-type humidifiers 441, 442, and 443 and the mist-type humidifier 445 to the in-device tank 423, when the sheet manufacturing apparatus 100 is stopped. For example, a pipe channel, through which water returns to the in-device tank 423 from a reservoir that stores water for humidifying, may be provided in the vaporization-type humidifiers 441, 442, and 443 and the mist-type humidifier 445.

The housing 300 accommodates a compressor 426 and a dust collecting device 428 on the side of the front surface 300F. The compressor 426 generates compressed air so as to supply the air to each member of the sheet manufacturing apparatus 100. For example, the compressed air of the compressor 426 may be used for clearing powder dust that is attached to a filter (not shown) in the dust collecting unit 27 or the filter unit 430 to be described below. In addition, in a case where an ionizer (not shown) is disposed in the rough crushing unit 12, the compressed air may be supplied to the ionizer from the compressor 426.

The dust collecting device 428 is a device that collects dust containing fibers from air suctioned from the suction mechanism 76 (FIG. 3). The dust collecting device 428 includes the dust collecting blower 429 and the filter unit 430. The dust collecting blower 429 suctions air from the suction mechanism 76, and the filter unit 430 traps dust containing a mixture or fibers contained in the suctioned air. The dust trapped by the filter unit 430 contains fibers or particles corresponding to matter to be removed, which has been separated by the first web former 45, in addition to a mixture that is not accumulated on the mesh belt 72, in some case. The dust collecting blower 429 suctions air from the suction mechanism 76 through the filter unit 430, and air released by the dust collecting blower 429 is released outside the housing 300 (the sheet manufacturing apparatus 100), for example.

In addition, the dust collecting device 428 may be configured to suction air by the suction mechanism 79c (FIG. 3) of the conveying unit 79.

In addition, as shown in FIG. 4, on the front surface 300F, a calendar roller pair 85 configuring the pressurizing unit 82 and a heating roller pair 86 configuring the heating unit 84 are disposed. In other words, the pressurizing/heating unit 80 is disposed in the front section 321 (FIG. 2) of the housing 300. In addition, the cutter 90 and the paper discharge stacker 415 connected to the cutter 90 are disposed on a side of the heating unit 84. The cutter 90 and the paper discharge stacker 415 are positioned in the front section 321.

The paper discharge stacker 415 is positioned on the right-side surface 300R of the housing 300. The paper discharge stacker 415 is disposed to be positioned on the front side of the electrical unit housing 500. The paper discharge stacker 415 configures the discharge unit 96 (FIG. 3) and includes paper discharge trays 416 and 417 to which the cut sheet S is discharged. For example, the sheets S having different sizes from each other are discharged to the paper discharge tray 416 and the paper discharge tray 417. In other words, the paper discharge stacker 415 includes a mechanism that separates the sheets S cut by the cutter 90 for each size so as to discharge the sheets to the paper discharge tray 416 and the paper discharge tray 417. Alternatively, a configuration may be employed, in which the sheets S are separated for each color and discharge to the paper discharge tray 416 and the paper discharge tray 417. In addition, the sheet S that is discharged from the cutter 90 may be stored inside the paper discharge stacker 415.

As shown in FIG. 5, a drum portion 41 and the first web former 45 are disposed in the upper portion of the housing 300 on a side of the right-side surface 300R. As shown in FIG. 5, the first web former 45 may be configured to expose the mesh belt 46 or may not include a cover that covers the mesh belt 46.

The electrical unit housing 500 is disposed on the side of the right-side surface 300R of the housing 300. As shown in FIG. 4 and FIG. 5, when the electrical unit housing 500 and the exterior panel 500P are excluded, a frame 510 is exposed. The frame 510 forms a framework (frame) of the electrical unit housing 500. In other words, the frame 510 forms a rectangular parallelepiped-shaped framework so as to match an external shape of the electrical unit housing 500. The frame 510 is configured of a bar or a pipe which is made of metal or synthetic resin. It is possible to employ a configuration in which the electrical unit housing 500 is separable from the housing 300. In this case, the frame 510 is connected to the frame 310 according to an installation state of the sheet manufacturing apparatus 100.

In addition, a plurality of legs 352 are provided under the frame 510, each leg 352 is in contact with an installation surface of the electrical unit housing 500 so as to support the electrical unit housing 500. The installation surface is a floor of an installation place of the sheet manufacturing apparatus 100, and it is preferable that the installation surface be a flat surface. The legs 352 are fixed to the frame 510; however, the legs 352 may be fixed to a joining portion between the frame 310 and the frame 510, for example. The legs 352 may each be configured to have an adjuster that is capable of adjusting a height, or some legs 352 may each be configured of a caster having a wheel.

A power supply board 512 (electrical unit), in which a power circuit that supplies electric power source to devices which are accommodated in the housing 300 is installed, is fixed to the frame 510. Power semiconductor elements, which configure an inverter circuit or an AC/DC converter for supplying electric power source, and a conductor that connects the elements are installed in the power supply board 512. In addition, on the power supply board 512, a heatsink (not shown), a heat dissipating fan, or the like that cools the power semiconductors or the like may be mounted, or a liquid-cooled or air-cooled cooling system may be mounted.

Figure 6:
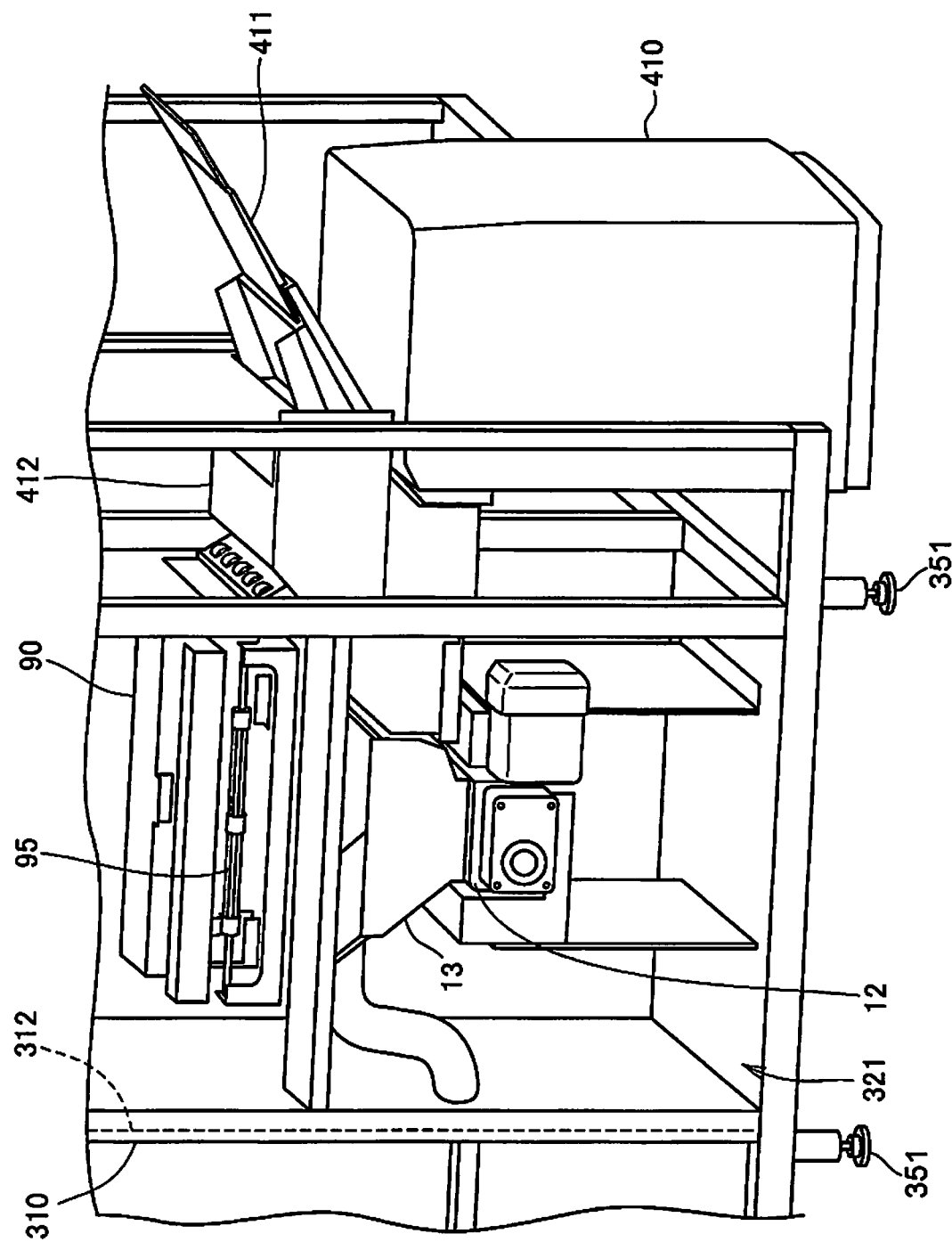
FIG. 6 is an enlarged view of main parts on a right-side surface of the sheet manufacturing apparatus.

FIG. 6 is an enlarged view of main parts on the right-side surface 300R of the sheet manufacturing apparatus 100.

As shown in FIG. 6, the rough crushing unit 12 is disposed in the lower portion on the side of the right-side surface 300R in the front section 321.

The rough crushing unit 12 is positioned on the side of the rear surface 300B of the paper feed stacker 410. A feed unit 412 that conveys the used paper as the raw material toward the rear side of the paper feed stacker 410 is attached to the paper feed stacker 410. The feed unit 412 conveys the used paper toward the rough crushing unit 12 from the paper feed stacker 410 or the paper feed tray 411.

A chute 13 is disposed on the rough crushing unit 12. The chute 13 is widened toward the upper side and sends the raw material that falls into an inside thereof to the rough crushing unit 12. The cutter 90 is positioned above the chute 13. FIG. 6 shows a discharge port 95 through which the cutter 90 discharges the sheet S to the paper discharge stacker 415 (FIG. 5). The cutter 90 includes a first cutter 92 (FIG. 3) and a second cutter 94 (FIG. 3) on a back side of the discharge port 95. When the cutter 90 cuts the sheet S, offcuts are generated. For example, the second cutter 94 cuts the sheet S in a direction parallel to the conveyance direction of the sheet S, and thereby cutting the sheet S such that a width of the sheet S becomes a predetermined size that is set in advance. Here, the width of the sheet S is measured in a direction at the right angle with respect to the conveyance direction. In this case, an end portion of the sheet S in a width direction, that is, a side end portion, is cut down as an offcut. In addition, also in a case where the first cutter 92 cuts the sheet such that a size of the sheet S in a length direction (conveyance direction) becomes a predetermined size that is set in advance, offcuts may be generated. For example, in a case where, after the sheet manufacturing apparatus 100 starts up, a leading end of the sheet S that is sent to the cutter 90 from the pressurizing/heating unit 80 is cut by the first cutter 92 for the first time, offcuts are generated.

Since the cutter 90 is disposed at a higher position than the rough crushing unit 12, the offcuts generated when both end portions of the sheet S are cut down from the second cutter 94 freely fall to the chute 13 from the cutter 90. For example, when the cutter 90 has a configuration in which the first cutter 92 and the second cutter 94 are provided an opening on a lower side, and the opening is positioned above the chute 13, it is possible to transport the offcuts to the chute 13 without using power.

In the configuration, the offcuts generated when the cutter 90 cuts the sheet S and the used paper of the raw material that is conveyed by the feed unit 412 from the paper feed stacker 410 are supplied to the rough crushing unit 12.

The rough crushing unit 12 cuts the raw material by the rough crushing blades 14 (FIG. 3) provided internally, and the cut pieces are sent to the defibration unit 20 by the suction force of the defibration unit blower 26 as described above.

Figure 7:
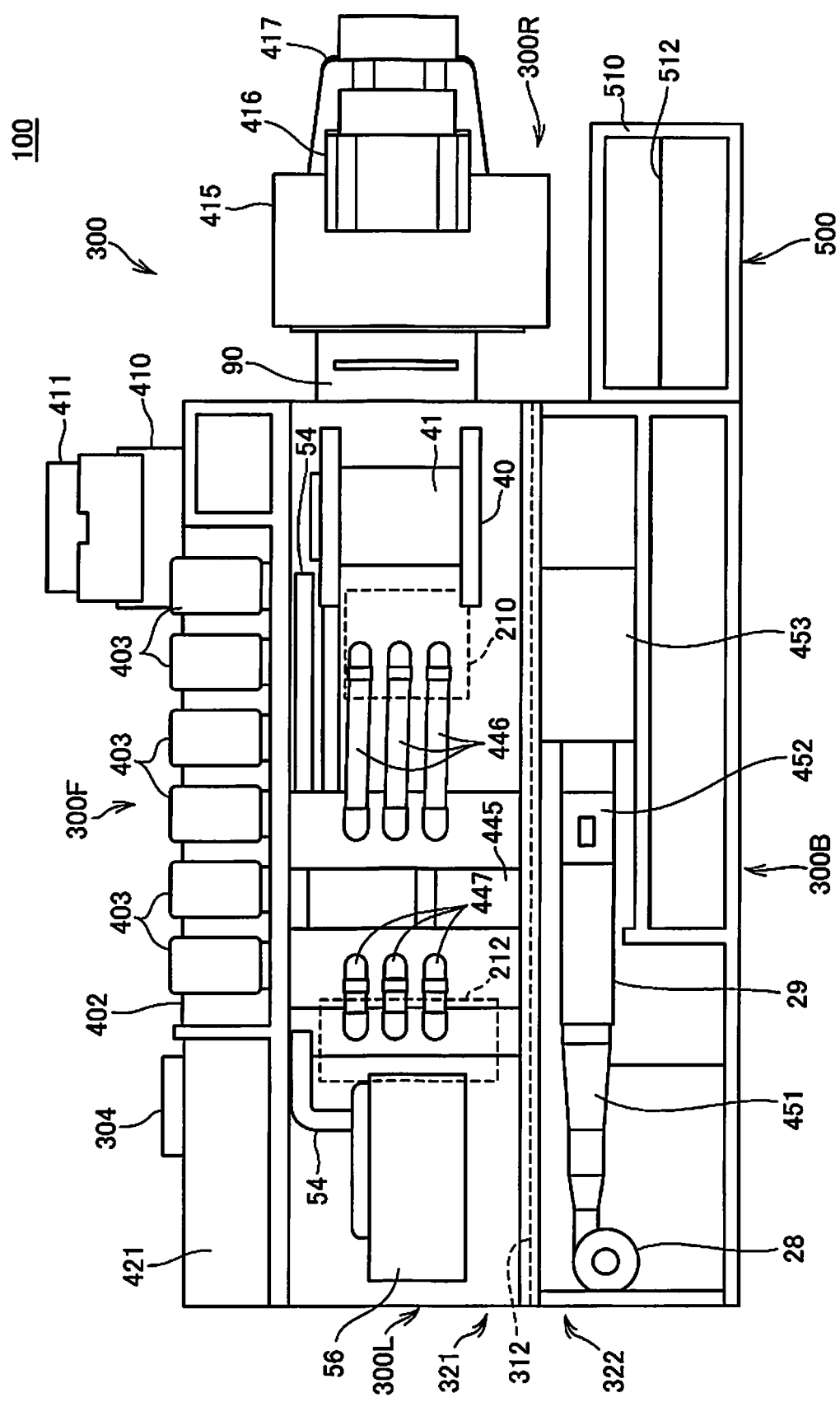
FIG. 7 is a plan view of the sheet manufacturing apparatus in a state in which the exterior panel is excluded.

FIG. 7 is a plan view of the sheet manufacturing apparatus 100 and shows a state in which the exterior panel 300P and the exterior panel 500P are excluded. FIG. 7 corresponds to a view of the housing 300 viewed from the side of the upper surface 300U.

As shown in FIG. 7, the resin cartridge accommodating portion 402, the control unit 421, and the paper feed stacker 410, which are exposed on the side of the front surface 300F, are disposed in the front section 321 of the housing 300. Further, a mixing blower 56, the mist-type humidifier 445, the cutter 90, and the sorting unit 40 are disposed more on the side of the rear surface 300B than the members described above. The first web former 45 is disposed below the sorting unit 40 as shown in FIG. 5. The mixing blower 56, the mist-type humidifier 445, the cutter 90, the sorting unit 40, and the first web former 45 are positioned in the front section 321.

The pipe 54 is disposed on the side of the rear surface 300B of the resin cartridge 403. The pipe 54 is positioned in the front section 321, together with the resin cartridge accommodating portion 402 and the discharge unit 52a. The pipe 54 is provided to extend in an alignment direction of the resin cartridges 403 and reaches the mixing blower 56 that is positioned on the side of the left-side surface 300L. The additive is supplied to the pipe 54 by the discharge unit 52a (FIG. 4) from the resin cartridge 403, and the additive is transported to the mixing blower 56 through the pipe 54.

The mist-type humidifier 445 is an ultrasound type humidifier and includes a reservoir (not shown) that stores water, which is to be supplied to the in-device tank 423 (FIG. 4), and a vibrating unit (not shown) that applies vibration to the water in the reservoir so as to atomize the water and generates mist. The mist-type humidifier 445 includes mist supply pipes 446 and 447 that supply air containing mist. The mist supply pipe 446 is used for supplying air containing mist to the humidifying unit 210 (FIG. 3) from the mist-type humidifier 445. The mist supply pipe 447 is used for supplying air containing mist to the humidifying unit 212 (FIG. 3) from the mist-type humidifier 445. The mist-type humidifier 445 may include a fan (not shown) that sends the air containing the mist to the mist supply pipes 446 and 447.

The humidifying units 210 and 212 are disposed at a position at which the humidifying units are not exposed to the upper surface 300U, and a dashed line in FIG. 7 represents the position of the humidifying units 210 and 212.

The humidifying unit 210 is positioned closer to the side of the mist-type humidifier 445 than the sorting unit 40. Therefore, the first web former 45 is configured to convey the first web W1 (FIG. 3) from the side of the right-side surface 300R toward the side of the left-side surface 300L. By comparison, the humidifying unit 212 is positioned closer to the side of the mist-type humidifier 445 than the accumulation unit 60 (FIG. 8) and the second web former 70 (FIG. 8) which are positioned right below the mixing blower 56. Therefore, the second web former 70 is configured to convey the second web W2 (FIG. 3) from the side of the left-side surface 300L toward the side of the right-side surface 300R. As shown in FIG. 4, the second web W2 is pressurized and heated by the pressurizing unit 82 and the heating unit 84 so as to be transported in the conveyance direction, and the sheet S reaches the paper discharge stacker 415 through the cutter 90.

In other words, in the sheet manufacturing apparatus 100, the conveyance directions of the first web W1 and the second web W2 are opposite to each other, and thus the humidifying unit 210 and the humidifying unit 212 are both positioned close to the mist-type humidifier 445. Consequently, it is possible to shorten both the mist supply pipes 446 and 447 that supply mist. Since mist is attached to an inner wall of the pipe in the mist supply pipes 446 and 447, it is possible to supply mist effectively when the mist supply pipes 446 and 447 are short. In addition, since it is possible to decrease a difference between lengths of the mist supply pipe 446 and the mist supply pipe 447, it is advantageous in that a bias in a supply amount of mist is unlikely to occur.

In addition, as shown in FIGS. 4 and 7, a part of the cutter 90 projects toward the outside of the housing 300 so as to be connected to the paper discharge stacker 415 on the outside of the housing 300. Therefore, it is easy to perform maintenance of blades (not shown) that configure the first cutter 92 (FIG. 3) and the second cutter 94 (FIG. 3) or maintenance such as unclogging of the sheet S in the cutter 90.

In addition, the trapping blower 28 and a pipe 29 (air current pipe) are disposed in the rear section 322 of the housing 300 on the side of the upper surface 300U. The trapping blower 28 is a blower that suctions air in the first web former 45 as described above.

The pipe 29 (air current pipe) is configured to have a straightener 451, a detector 452, and a chamber 453. The straightener 451 is a pipe having a tapered shape and is formed to have a small sectional area on the upstream side and a large sectional area on the downstream side of an air current in the pipe 29 (air current pipe). For example, the straightener 451 can be configured as a cylinder having a circular cross section; however, the cross section may have an elliptical shape or an angular shape. The straightener 451 straightens a current of air that is blown out by the trapping blower 28.

A sensor (not shown) that measures air flowing inside the pipe 29 (air current pipe) is disposed in the detector 452. The sensor disposed in the detector 452 measures at least any one of a temperature, a flow speed (wind speed), or a flow rate (air volume). A temperature sensor, a wind speed sensor, and an air volume sensor may be all provided in the detector 452. Measurement values of the sensors are analyzed by the control unit 421 and is used for control or the like of a rotation amount of a blower (the defibration unit blower 26, the trapping blower 28, or the mixing blower 56) provided in the sheet manufacturing apparatus 100.

The pipe 29 (air current pipe) is disposed at the position. In this manner, the pipe 29 (air current pipe) can be formed as a straight long pipe, and it is possible to enhance measurement accuracy of the detector 452.

The chamber 453 distributes air that is blown out by the trapping blower 28. A pipe (not shown), through which air is supplied to each of the vaporization-type humidifiers 441, 442, and 443 (FIG. 9), is connected to the chamber 453. Therefore, the air that is blown out by the trapping blower 28 is used for humidification by the vaporization-type humidifiers 441, 442, and 443. The vaporization-type humidifiers 441, 442, and 443 use high temperature air, and thereby it is possible to perform humidification effectively. The air suctioned by the trapping blower 28 flows through the defibration unit 20 (and the sorting unit 40). Therefore, it is easy to keep heat, and it is possible to expect to improve efficiency of the vaporization-type humidifiers 441, 442, and 443.

Figure 8:
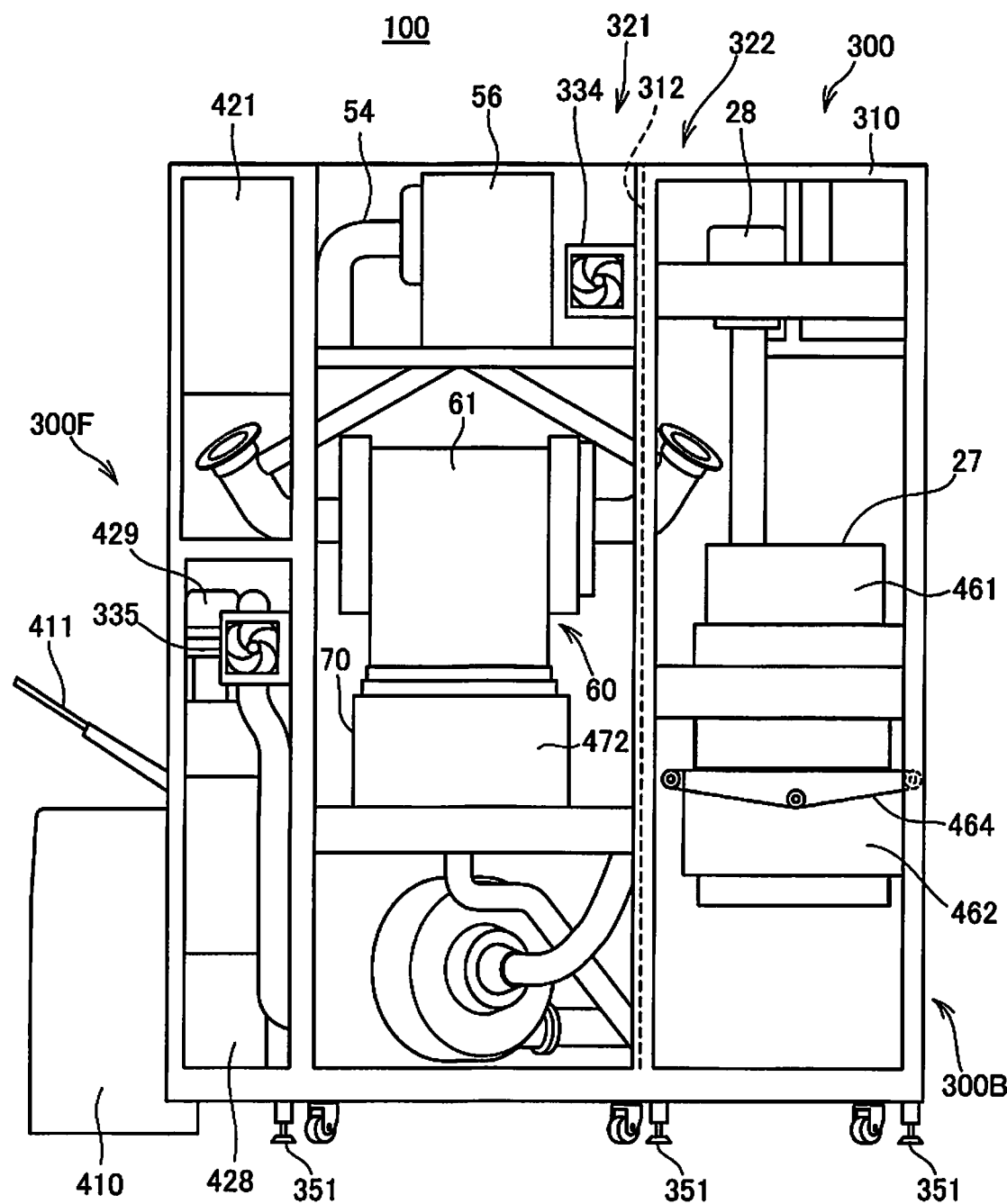
FIG. 8 is a left side view of the sheet manufacturing apparatus in a state in which the exterior panel is excluded.
Figure 10:
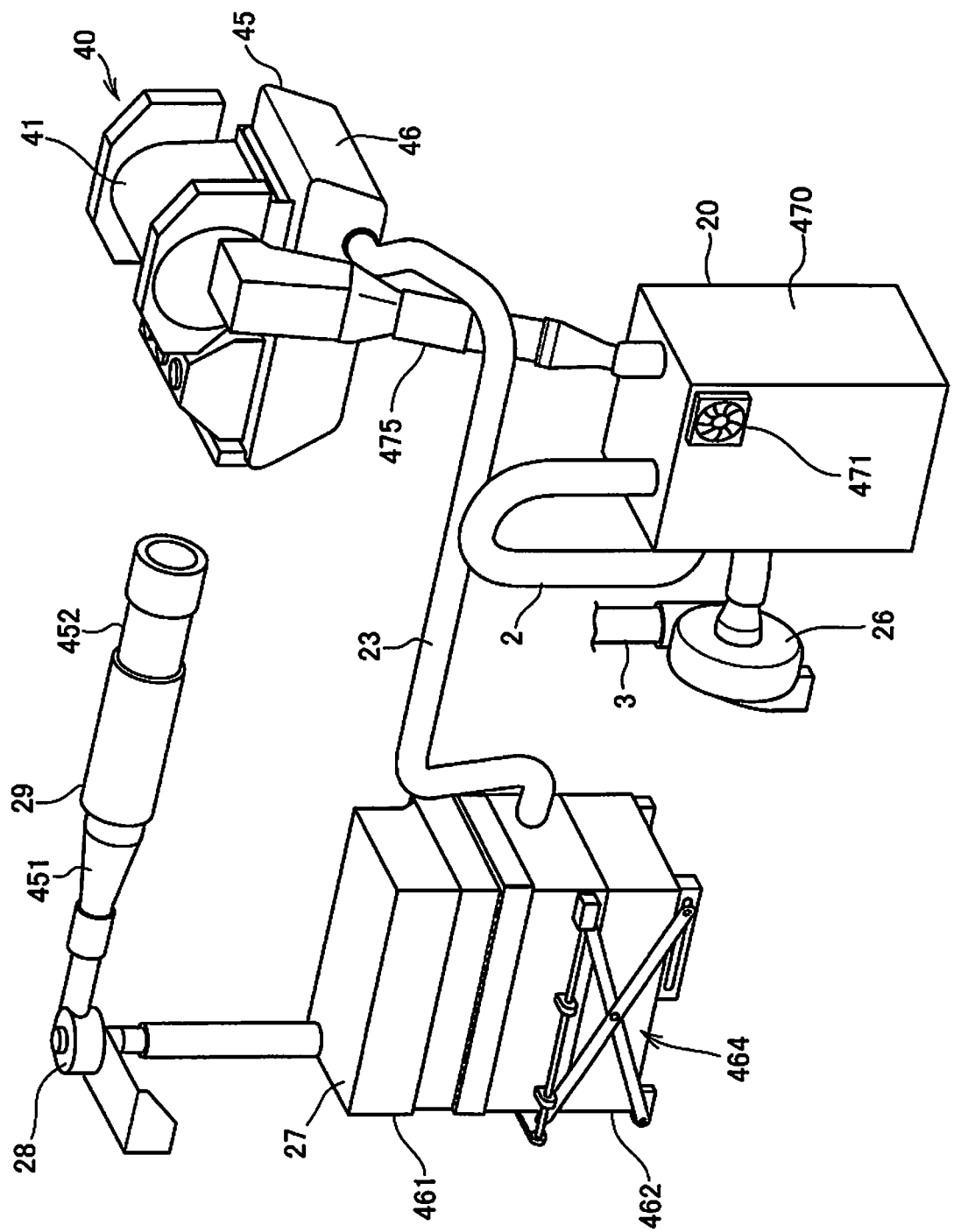
FIG. 10 is a perspective view showing a configuration of main parts of the sheet manufacturing apparatus.

FIG. 8 is a left side view of the sheet manufacturing apparatus 100 and shows a state in which the exterior panel 300P is excluded. FIG. 8 corresponds to a view of the housing 300 viewed from the side of the left-side surface 300L. In addition, FIG. 9 is a rear view of the sheet manufacturing apparatus 100 and shows a state in which the exterior panel 300P and the exterior panel 500P are excluded. FIG. 9 corresponds to a view of the housing 300 viewed from the side of the rear surface 300B. FIG. 10 is a perspective view showing a configuration of main parts of the sheet manufacturing apparatus 100.

As shown in FIG. 8, the drum portion 61 of the accumulation unit 60 is disposed right below the mixing blower 56, and the second web former 70 is disposed below the drum portion 61. The second web former 70 includes a case 472, and the case 472 accommodates the mesh belt 72 (FIG. 3), the stretching roller 74 (FIG. 3), and the like.

In addition, as shown in FIG. 9, the vaporization-type humidifiers 441, 442, and 443 are aligned on the side of the rear surface 300B which is the back surface side of the housing 300. The vaporization-type humidifiers 441, 442, and 443 are positioned right below the chamber 453, and the air is sent through the chamber 453 to the vaporization-type humidifiers 441, 442, and 443. The vaporization-type humidifiers 441, 442, and 443 are positioned in the rear section 322, together with the straightener 451, the detector 452, and the chamber 453 which configure the pipe 29 (air current pipe).

As shown in FIGS. 8 and 9, the dust collecting unit 27 is disposed below the trapping blower 28. The dust collecting unit 27 is disposed at a position close to the side of the left-side surface 300L on the side of the rear surface 300B of the housing 300. The dust collecting unit 27 is exposed on the side of the left-side surface 300L, in a case where the opening/closing door 302 (FIG. 1) is opened.

In addition, as shown in FIG. 9, the defibration unit 20 is disposed in a lower portion on the side of the rear surface 300B. The defibration unit 20 is positioned on the side of the rear surface 300B, that is, in the rear section 322.

Here, configurations of the members including the dust collecting unit 27 and the defibration unit 20 are described with reference to FIG. 10.

The dust collecting unit 27 includes a trapping unit 461 and a collection box 462. The trapping unit 461 traps the matter to be removed by using a filter (not shown) from the air suctioned from the first web former 45 with a suction force of the trapping blower 28. The collection box 462 is connected to the trapping unit 461 via a lifting/lowering mechanism 464 in a liftable/lowerable manner.

The trapping unit 461 accommodates a plurality of filters. The pipe 23 that is continuous to a lower side of the mesh belt 46 of the first web former 45 is connected to the trapping unit 461 on the upstream side of the filter, and the trapping blower 28 that is positioned above the dust collecting unit 27 is connected to the trapping unit 461 on the downstream side of the filter.

The trapping blower 28 is operated through the control performed by the control unit 421 and suctions the air obtained by removing matter to be removed by the filter so as to send the air to the pipe 29 (air current pipe). The trapping blower 28 operates, and thereby the matter to be removed is accumulated in the filter inside the trapping unit 461. The matter to be removed falls down to the collection box 462 naturally or by the compressed air that is supplied from the compressor 426 (FIG. 4).

The collection box 462 is open on the upper side, has a recessed box shape on the lower side, and functions as a container that contains the matter to be removed which falls from the trapping unit 461. A gathering bag (not shown) that gathers the matter to be removed can be attached in the collection box 462, and the matter to be removed which falls from the trapping unit 461 falls and is contained into the gathering bag.

It is possible to lower the collection box 462 by the operation of the lifting/lowering mechanism 464. The sheet manufacturing apparatus 100 of the embodiment includes the lifting/lowering mechanism 464 using an X link mechanism. The lifting/lowering mechanism 464 is manually driven through an operation of a handle (not shown) and moves the collection box 462 between an upper position and a lower position shown in FIG. 10. At the upper position, the lifting/lowering mechanism comes into a state in which the collection box 462 blocks the lower side of the trapping unit 461. By comparison, at the lower position, a gap is formed between the collection box 462 and the trapping unit 461, and the gathering bag can be taken out freely from the collection box 462.

The lifting/lowering mechanism 464 is not limited to an X link type mechanism, and it is possible to apply any mechanism such as parallel link type mechanism. In addition, the configuration is not limited to the operation of the lifting/lowering mechanism 464 through a manual operation of the handle, and the lifting/lowering mechanism 464 may be operated by using a power source such as a motor.

Opening of the opening/closing door 302 shown in FIG. 1 causes the dust collecting unit 27 to be exposed to the left-side surface 300L. Opening of the opening/closing door 302 and the operation of the lifting/lowering mechanism 464 makes it possible to collect the gathering bag from the dust collecting unit 27. Consequently, it is possible to remove the matter to be removed from the sheet manufacturing apparatus 100.

In addition, as shown in FIG. 10, In addition, the defibration unit 20 is accommodated in a box-shaped defibration unit housing 470. The defibration unit housing 470 accommodates a rotor (not shown) that configures the defibration unit 20 and a liner (not shown). A sound absorbing material and a heat insulating material are applied inside the defibration unit housing 470, and thus transmission of a noise and heat that are generated from rotation of the rotor is suppressed. A foamed synthetic resin such as polystyrol or polyurethane may be used as the sound absorbing material and the heat insulating material of the defibration unit housing 470, or an inorganic material such as fiberglass or wood may be used. In addition, a material functioning as both the sound absorbing material and heat insulating material may be used, or the materials may be disposed on an inner side of an outer wall material of the defibration unit housing 470.

In the configuration, an exhaust fan 471 is attached to the defibration unit housing 470, and it is possible to dissipate heat in the inside of the defibration unit housing 470 with the exhaust fan 471. The exhaust fan 471 may be configured to release air from the defibration unit housing 470 to the housing 300. In addition, the exhaust fan 471 may be configured to release air to the outside of the housing 300.

The rough-crushed materials from the rough crushing unit 12 (FIG. 6) are supplied to the defibration unit 20 through the pipe 2. In addition, a second sorted substance transport pipe 475 (return pipe) is connected to the defibration unit 20. The second sorted substance transport pipe 475 is the return pipe through which the second sorted substance that is sorted by the drum portion 41 at the higher position than the defibration unit 20 falls to the defibration unit 20 from the drum portion 41. An upper end of the second sorted substance transport pipe 475 is connected to the drum portion 41, and a lower end thereof is connected to the defibration unit 20. Therefore, as shown in FIG. 9, the second sorted substance transport pipe 475 penetrates the partition plate 312 between the upper end and the lower end.

As described above, when the defibrated substance is delivered to the drum portion 41 through the pipe 3, the first sorted substance and the matter to be removed drop to flow to the first web former 45 in the drum portion 41, and the second sorted substance does not drop but passes through the drum portion 41. Here, the second sorted substance having passed through the drum portion 41 flows to the second sorted substance transport pipe 475, falls in the second sorted substance transport pipe 475, and is sent to the defibration unit 20. Here, the second sorted substance freely falls to flow to the defibration unit 20 in the second sorted substance transport pipe 475, particularly, even when power is not applied.

As described above, the sheet manufacturing apparatus 100, to which the present invention is applied, includes: the defibration unit 20 that defibrates the raw material containing fibers in a gas atmosphere; and the sheet former 100*b* that forms the sheet S by using at least some defibrated substances obtained through the defibrating process performed by the defibration unit 20. In the sheet manufacturing apparatus 100, the defibration unit 20 and the sheet former 100*b* are thermally blocked from each other.

For example, the sheet former 100*b* includes at least the second web former 70, the pressurizing unit 82, and the cutter 90 which are disposed in the front section 321. In addition, the defibration unit 20 is disposed in the rear section 322. For example, the front section 321 and the rear section 322 are partitioned off by the partition plate 312 and thermally blocked from each other. Consequently, since the sheet former 100*b* is configured to be unlikely to be influenced by the heat emitted from the defibration unit 20, it is possible to suppress drying of the fibers in the sheet former 100*b*, and thereby it is possible to suppress charging of the fibers.

In addition, the sheet manufacturing apparatus 100 of the embodiment described above has a configuration in which the defibration unit 20 is accommodated in the defibration unit housing 470. The defibration unit housing 470 corresponds to the configuration in which the defibration unit 20 and the sheet former 100*b* are thermally blocked from each other. In addition, the defibration unit housing 470 corresponds to the configuration in which, in a case of using the heat insulating material, an effect of thermal blocking of the defibration unit 20 from the sheet former 100*b* further improves.

In addition, in the sheet manufacturing apparatus 100, the defibration unit 20 and the members configuring the sheet former 100*b* are separated from each other, and thereby it is possible to realize a thermal-blocking configuration.

The sheet manufacturing apparatus 100 includes: the defibration unit 20 that defibrates the raw material containing fibers in a gas atmosphere; and the sheet former 100*b* that forms the sheet S by using at least some defibrated substances obtained through the defibrating process performed by the defibration unit 20. In addition, the partition plate 312 that partitions off between the defibration unit 20 and the sheet former 100*b* is provided. Consequently, the partition plate 312 enables the sheet former 100*b* to be less influenced by the heat emitted from the defibration unit 20. Therefore, it is possible to suppress drying of the fibers in the sheet former 100*b*, and thereby it is possible to suppress charging of the fibers.

The sheet manufacturing apparatus 100 includes: the housing 300 that accommodates the defibration unit 20 and the sheet former 100*b*; the exhaust fans 331, 332, and 333 that release air from the rear surface 300B of the housing 300; and the partition plate 312 that partitions the inside of the housing 300 into the front section 321 and the rear section 322 of the housing 300. The partition plate 312 is provided with vent holes 313, 314, and 315 for ventilation from the front section 321 to the rear section 322 of the housing 300. Consequently, since it is possible to perform ventilation from the front section 321 to the rear section 322 of the housing 300 and release air from the rear surface 300B, it is possible to suppress propagation of heat from the rear section 322 to the front section 321 of the housing 300 and dissipate heat out of the housing 300 effectively. Therefore, since it is possible to decrease the propagation of heat from an instrument that generates a large amount of heat to another instrument of the instruments accommodated in the housing 300, it is possible to suppress drying of fibers due to the heat generated from the instrument, and it is possible to suppress charging of the fibers.

The sheet manufacturing apparatus 100 includes: the housing 300 that accommodates the defibration unit 20 and the sheet former 100*b*; and the exhaust fans 331, 332, and 333 that release air from the rear surface 300B of the housing 300. The partition plate 312 is disposed to partition the inside of the housing 300 into the front section 321 and the rear section 322 of the housing 300 and is provided with vent holes 313, 314, and 315 for ventilation from the front section 321 to the rear section 322 of the housing 300. Consequently, since it is possible to perform ventilation from the front section 321 to the rear section 322 of the housing 300, which is partitioned off by the partition plate 312, and release air from the rear surface 300B, it is possible to suppress propagation of the heat from the rear section 322 to the front section 321 of the housing 300 and dissipate the heat out of the housing 300 effectively. Therefore, since it is possible to decrease the propagation of heat from an instrument that generates a large amount of heat to another instrument, it is possible to suppress drying of fibers due to the heat generated from the instrument, and it is possible to suppress charging of the fibers.

The sheet manufacturing apparatus 100 includes: the trapping blower 28 that suctions the matter to be removed, which is not used in the sheet S, from the defibrated substances obtained through the defibrating process performed by the defibration unit 20; and the dust collecting unit 27 that traps the matter to be removed which is suctioned by the trapping blower 28. The defibration unit 20, the trapping blower 28, and the dust collecting unit 27 are installed in the rear section 322 that is partitioned off by the partition plate 312. Consequently, it is possible to release heat from the defibration unit 20, the trapping blower 28, and the dust collecting unit 27 rapidly out of the housing 300. Therefore, it is possible to suppress drying of the fibers due to the influence of the heat from the units, and thereby it is possible to suppress charging of the fibers. In addition, since instruments that perform a process of suctioning and trapping the matter to be removed from the defibrated substances are disposed in a concentrated manner, it is possible to perform movement of the defibrated substances and the matter to be removed efficiently, and it is possible to enhance utilization efficiency of an internal space of the housing 300.

In addition, the sheet manufacturing apparatus 100 includes: the pipe 29 (air current pipe) through which the air current after the trapping blower 28 performs suction and the dust collecting unit 27, traps the matter to be removed flows; the straightener 451 that straightens the air current flowing through the pipe 29 (air current pipe); and the detector 452 that measures at least one of a flow speed and a temperature of the air current in the pipe 29 (air current pipe). Consequently, the detector measures at least one of the flow speed and the temperature of the air current after the dust collecting unit 27 traps the matter to be removed, and thereby it is possible to detect a state of the air current in the sheet manufacturing apparatus 100 in detail. Therefore, the control unit 421 is capable of appropriately controlling the fan or the blower included in the sheet manufacturing apparatus 100, and thus it is possible to enhance the utilization efficiency of the air current.

The sheet manufacturing apparatus 100 includes: the vaporization-type humidifiers 441, 442, and 443 that vaporize water so as to supply humidified air, in which the vaporization-type humidifiers 441, 442, and 443 are installed in the rear section 322 that is partitioned off by the partition plate 312. Consequently, it is possible to suppress charging of the fibers by using the humidified air, and it is possible to use high-temperature air by the vaporization-type humidifiers 441, 442, and 443 by disposing the vaporization-type humidifiers 441, 442, and 443 together with the defibration unit 20 and the like in the rear section 322. Therefore, it is possible to cause the humidified air to contain a larger amount of moisture by the vaporization-type humidifiers 441, 442, and 443, and thus it is possible to perform humidifying more efficiently.

In addition, the sheet manufacturing apparatus 100 includes: the water supply unit (in-device tank 423) that is filled with water from a supply port installed on the side of the front surface 300F of the housing 300 and supplies water to the vaporization-type humidifiers 441, 442, and 443. Consequently, it is possible to easily supply water to the vaporization-type humidifiers 441, 442, and 443 disposed in the rear section 322 of the housing 300 from the side of the front surface 300F. In addition, a user is able to easily supply water to the water supply unit (in-device tank 423).

The sheet former 100b includes the second web former 70 that accumulates defibrated substances obtained through the defibrating process performed by the defibration unit 20 and forms the web; and the pressurizing unit 82 that pressurizes the web formed by the second web former 70 so as to form the sheet S. In addition, the sheet former 100b includes the cutter 90 that cuts the sheet S formed by the pressurizing unit 82 into a preset size. The second web former 70, the pressurizing unit 82, and the cutter 90 are installed in the front section 321 that is partitioned off by the partition plate 312. Consequently, it is possible to dispose functional units that configure the sheet former 100b at a position that is unlikely to be influenced by the heat from the defibration unit 20 or the like. Therefore, it is possible to suppress drying of the fibers in the sheet former 100b, it is possible to suppress charging of the fibers, and it is possible to improve manufacturing efficiency of the sheet and to achieve uniform sheet quality.

The sheet manufacturing apparatus 100 includes: the mixer 50 that mixes the resin and the defibrated substances obtained through defibration performed by the defibration unit 20 in a gas atmosphere, and the sheet former 100b includes the heating unit 84 that heats the mixture mixed by the mixer 50. The mixer 50 and the heating unit 84 are installed in the front section 321 that is partitioned off by the partition plate 312. Consequently, in the dry sheet manufacturing apparatus 100 that mixes and heats the defibrated substances and the resin in a gas atmosphere, it is possible to dispose the mixer 50 at a position that is unlikely to be influenced by the heat from the defibration unit 20 or the like. Therefore, it is possible to suppress charging of the fibers in a process of mixing the defibrated substances and the resin in the gas atmosphere, and it is possible to improve manufacturing efficiency of the sheet and to achieve uniform sheet quality.

The sheet manufacturing apparatus 100 includes: the sorting unit 40 that sorts the defibrated substances obtained through defibration performed by the defibration unit 20 into the first sorted substance and the second sorted substance. In addition, the sheet manufacturing apparatus includes: the pipe 54 through which the first sorted substance sorted by the sorting unit 40 is transported along with the air current to the mixer 50; and the discharge unit 52a that supplies the resin contained in the resin container to the pipe 54. The pipe 54 and the discharge unit 52a are installed in the front section 321 that is partitioned off by the partition plate 312. Consequently, the process of sorting the defibrated substances, the process of transporting the sorted first sorted substance, and the process of supplying the resin are performed at a position that is unlikely to be influenced by the heat from the defibration unit 20 or the like, and thereby it is possible to suppress charging of the fibers and improve the manufacturing efficiency of the sheet or achieve uniform sheet quality.

The sheet manufacturing apparatus 100 includes the opening/closing door 301 that is positioned on the front surface 300F of the housing 300, and the additive supply unit 52 is installed to face the opening/closing door 301. Consequently, it is possible to easily perform work on the additive supply unit 52. For example, the user is able to easily install or replace the resin cartridge 403 that is mounted on the additive supply unit 52.

The sorting unit 40 is installed at a higher position than the defibration unit 20, and the sheet manufacturing apparatus includes the second sorted substance transport pipe 475 which penetrates the partition plate 312 and through which the second sorted substance sorted by the sorting unit 40 is transported to the defibration unit 20. Consequently, the second sorted substance sorted from the defibrated substances can be transported to the defibration unit 20, be subjected to the defibrating process, and be again used as the raw material. In addition, it is possible to dispose the sorting unit 40 at a higher position than the defibration unit 20, and thereby it is possible to easily transport the second sorted substance to the defibration unit 20 from the sorting unit 40. For example, it is possible to employ a configuration in which the second sorted substance sorted by the sorting unit 40 falls to the defibration unit 20 through the second sorted substance transport pipe 475.

The sheet manufacturing apparatus 100 includes: the rough crushing unit 12 that roughly crushes the raw material so as to supply cut material to the defibration unit 20; and the cutter 90 that is installed at a higher position than the rough crushing unit 12 and cuts the sheet S formed by the sheet former 100b into a preset size. In the sheet manufacturing apparatus 100, the offcuts cut by the cutter 90 are transported to the rough crushing unit 12. Consequently, in a case where the offcuts are generated by the cutter 90, the offcuts can be transported to the rough crushing unit 12 so as to be used as the raw material of the sheet. In addition, since the offcuts are unlikely to be influenced by the heat from the defibration unit 20 or the like in a process of being transported from the cutter 90, it is possible to suppress charging of the offcuts. In addition, it is possible to dispose the cutter 90 at a higher position than the rough crushing unit 12, and thereby it is possible to easily transport the offcuts to the rough crushing unit 12 from the cutter 90. For example, it is possible to employ a configuration in which the offcuts generated by the cutter 90 freely fall toward the rough crushing unit 12.

The sheet manufacturing apparatus 100 includes the power supply board 512 that is installed outside the housing 300 and supplies electric power to a power component included in the defibration unit 20 and the sheet former 100b. Consequently, it is possible to dispose the power supply board 512 outside the housing 300, and thereby it is possible to suppress an influence of the heat from the power supply board 512 on the fibers of the raw material of the sheet. In addition, it is possible to cool a circuit or the like which is mounted on the power supply board 512 efficiently. In addition, it is possible to protect the power supply board 512 from powder dust or the like generated in the housing 300.

The sheet manufacturing apparatus 100 includes the paper feed stacker 410 that is installed on the front surface 300F of the housing 300 and supplies the raw material to the rough crushing unit 12. Consequently, it is possible to easily perform work on the paper feed stacker 410 from the front surface 300F of the housing 300. For example, the user is able to easily supply the used paper to the paper feed stacker 410.

The embodiment described above is only a specific aspect for implementing the present invention described in Claims, and the present invention is not limited thereto. The entire configuration described in the embodiment is not also limited as the essential configuration requirement of the present invention. In addition, the invention is not limited to the configurations of the embodiments described above, and it is possible to implement the invention in various aspects within a range without departing from a gist thereof.

For example, a product is not limited to the sheet S, and the sheet manufacturing apparatus 100 may be configured to manufacture a hard sheet or a board-like or a web-like product configured of stacked sheets. In addition, the sheet S and paper may be paper manufactured by using pulp or used paper as the raw material or may be a nonwoven fabric containing natural fibers or synthetic resin fibers. In addition, the property of the sheet S is not particularly limited. The sheet may be paper that can be used as recording paper (for example, a so-called PPC sheet) for writing or printing or may be used as wall paper, wrapping paper, colored paper, drawing paper, kent paper, or the like. In addition, in a case where the sheet S is the nonwoven fabric, the sheet may be used as a textile board, tissue paper, kitchen paper, a cleaner, a filter, a liquid absorbent, a sound absorber, a cushioning material, a mat, or the like, in addition to the common nonwoven fabric.

In addition, in the embodiment, a case where the present invention is applied to a dry type of sheet manufacturing apparatus 100 in which water is not used as much as possible is described; however, the present invention is not limited thereto. For example, the present invention may be applied to a sheet manufacturing apparatus that puts water to a raw material containing fibers, separates the material under mainly a mechanical action so as to perform reshaping, and manufactures a so-called wet sheet. In addition, in the embodiment described above, a configuration is described, in which the sheet S is cut by the cutter 90; however, a configuration may be employed, in which the sheet S processed by the pressurizing/heating unit 80 is wound around the winding roller.

REFERENCE SIGNS LIST 2 pipe
3 pipe (defibrated substance transport pipe)
7 pipe
8 pipe
9 chute
10 supply unit
12 rough crushing unit
13 chute
14 rough crushing blade
20 defibration unit
23 pipe
26 defibration unit blower
27 dust collecting unit (trapping unit)
28 trapping blower (suction unit)
29 pipe (air current pipe)
40 sorting unit
41 drum portion
42 introduction port
43 housing portion
45 first web former
46 mesh belt
47 stretching roller
48 suction unit
49 rotary body
50 mixer
52 additive supply unit (resin container)
52a discharge unit (resin supply unit)
54 pipe (first sorted substance transport pipe)
56 mixing blower
60 accumulation unit
61 drum portion
62 introduction port
63 housing portion
70 second web former (web former)
72 mesh belt
74 stretching roller
76 suction mechanism
79 conveying unit
79a mesh belt
79b stretching roller
79c suction mechanism
80 pressurizing/heating unit
82 pressurizing unit
84 heating unit
85 calendar roller
86 heating roller
90 cutter 92 first cutter
94 second cutter
95 discharge port
96 discharge unit
100 sheet manufacturing apparatus
100a fiber generating unit
100b sheet former
202, 204, 206, 208 humidifying unit
210, 212 humidifying unit
300 housing
300B rear surface
300F front surface
300L left-side surface
300P exterior panel
300R right-side surface
300U upper surface
301 opening/closing door (door)
310 frame
312 partition plate
313, 314, 315 vent hole
321 front section
322 rear section
331, 332, 333 exhaust fan (exhaust unit)
351, 352 leg
403 resin cartridge
410 paper feed stacker (raw material supply unit)
411 paper feed tray
415 paper discharge stacker
421 control unit
423 in-device tank (water supply unit)
424 water feed nozzle (water supply unit)
441, 442, 443 vaporization-type humidifier (vaporization-type humidifying unit)
445 mist-type humidifier
451 straightener
452 detector
461 trapping unit
475 second sorted substance transport pipe (return pipe)
500 electrical unit housing
500P exterior panel
510 frame
512 power supply board (electrical unit)
P subdivided body
S sheet
W1 first web
W2 second web

The invention claimed is:

1. A sheet manufacturing apparatus comprising:
a defibration unit that defibrates a raw material containing fibers in a gas atmosphere;
a first web former that accumulates defibrated substances obtained through a defibrating process performed by the defibration unit and forms a first web;
a mixer that mixes a resin and defibrated substances accumulated by the first web former in a gas atmosphere; and
a second web former that accumulates the defibrated substances and the resin mixed by the mixer and forms a second web,
wherein the defibration unit and the second web former are thermally blocked from each other.

2. The sheet manufacturing apparatus according to claim 1,
wherein the defibration unit and the first web former are thermally blocked from each other.

3. A sheet manufacturing apparatus comprising:
a defibration unit that defibrates a raw material containing fibers in a gas atmosphere;
a first web former that accumulates defibrated substances obtained through a defibrating process performed by the defibration unit and forms a first web;
a mixer that mixes a resin and defibrated substances accumulated by the first web former in a gas atmosphere;
a second web former that accumulates the defibrated substances and the resin mixed by the mixer and forms a second web; and
a first partition plate that is a partition between the defibration unit and the second web former.

4. The sheet manufacturing apparatus according to claim 3, further comprising:
a second partition plate that is a partition between the defibration unit and the first web former.

5. The sheet manufacturing apparatus according to claim 3, further comprising:
a housing that accommodates the defibration unit, the first web former, the mixer, and the second web former; and
the first partition plate that partitions an inside of the housing into a front section and a rear section of the housing,
wherein the second web former is provided in the front section,
wherein the first web former, the mixer, and the defibration unit are provided in the rear section,
wherein the first partition plate is provided with a vent hole for ventilation from the front section to the rear section of the housing, and
wherein the sheet manufacturing apparatus further includes an exhaust unit on the rear section side of the housing.

6. The sheet manufacturing apparatus according to claim 5, further comprising:
a suction unit that suctions matter to be removed, which is not used in the second web, from the defibrated substances obtained through the defibrating process performed by the defibration unit; and
a trapping unit that traps the matter to be removed which is suctioned by the suction unit,
wherein the defibration unit, the suction unit, and the trapping unit are installed in the rear section.

7. The sheet manufacturing apparatus according to claim 6, further comprising:
an air current pipe through which an air current after the suction unit performs suction and the trapping unit traps the matter to be removed flows;
a straightener that straightens the air current flowing through the air current pipe; and
a detector that measures at least one of a flow speed and a temperature of the air current in the air current pipe.

8. The sheet manufacturing apparatus according to claim 5, further comprising:
a vaporization-type humidifying unit that vaporizes water so as to supply humidified air,
wherein the vaporization-type humidifying unit is installed in the rear section.

9. The sheet manufacturing apparatus according to claim 5, further comprising:
a pressurizing unit that pressurizes the second web formed by the second web former so as to form a sheet; and
a cutter that cuts the sheet formed by the pressurizing unit into a preset size, wherein the pressurizing unit and the cutter are installed in the front section.

10. The sheet manufacturing apparatus according to claim 9, further comprising:
a rough crushing unit that roughly crushes the raw material and supplies a crushed material to the defibration unit,
wherein offcuts cut by the cutter are transported to the rough crushing unit.

11. The sheet manufacturing apparatus according to claim 3, further comprising:
a housing that accommodates the defibration unit, the first web former, the mixer, and the second web former; and
a second partition plate that partitions the inside of the housing into a front section and a rear section of the housing,
wherein the first web former, the mixer, and the second web former are provided in the front section,
wherein the defibration unit is provided in the rear section,
wherein the second partition plate is provided with a vent hole for ventilation from the front section to the rear section of the housing, and
wherein the sheet manufacturing apparatus further includes an exhaust unit on the rear section side of the housing.

12. The sheet manufacturing apparatus according to claim 3, further comprising:
a heating unit that heats a mixture mixed by the mixer,
wherein the heating unit is installed in the front section.

13. The sheet manufacturing apparatus according to claim 3, further comprising:
a sorting unit that sorts the defibrated substances obtained through defibration performed by the defibration unit into a first sorted substance and a second sorted substance;
a first sorted substance transport pipe through which the first sorted substance sorted by the sorting unit is transported along with an air current to the mixer; and
a resin supply unit that supplies the resin contained in a resin container to the first sorted substance transport pipe,
wherein the first sorted substance transport pipe and the resin supply unit are installed in the front section.

14. The sheet manufacturing apparatus according to claim 13,
wherein the sorting unit is installed at a higher position than the defibration unit in a direction of gravitational force, and
wherein the sheet manufacturing apparatus further includes a return pipe through which the second sorted substance sorted by the sorting unit is transported to the defibration unit.

15. The sheet manufacturing apparatus according to claim 3, further comprising:
an electrical unit that is installed outside the housing and supplies electric power to a power component included in the defibration unit.

16. A sheet manufacturing apparatus comprising:
a defibration unit that defibrates a raw material containing fibers in a gas atmosphere;
a first web former that accumulates defibrated substances obtained through a defibrating process performed by the defibration unit and forms a first web;
a mixer that mixes a resin and defibrated substances accumulated by the first web former in a gas atmosphere;
a second web former that accumulates the defibrated substances and the resin mixed by the mixer and forms a second web; and
a first partition plate that is a partition between the defibration unit and the first web former.

17. The sheet manufacturing apparatus according to claim 16, further comprising:
a second partition plate that is a partition between the mixer and the second web former.

* * * * *